US012591058B2

(12) United States Patent
    Zhu et al.

(10) Patent No.: US 12,591,058 B2
(45) Date of Patent: *Mar. 31, 2026

(54) DYNAMIC LASER EMISSION CONTROL IN LIGHT DETECTION AND RANGING (LIDAR) SYSTEMS

(71) Applicant: BEIJING VOYAGER TECHNOLOGY CO., LTD., Beijing (CN)

(72) Inventors: Wenbin Zhu, Beijing (CN); An-Chun Tien, Mountain View, CA (US); Chao Wang, Beijing (CN)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 1173 days.

This patent is subject to a terminal disclaimer.

(21) Appl. No.: 17/476,157

(22) Filed: Sep. 15, 2021

(65) Prior Publication Data

US 2023/0079909 A1      Mar. 16, 2023

(51) Int. Cl.

| | |
|---|---|
| *G01S 17/04* | (2020.01) |
| *G01S 7/481* | (2006.01) |
| *G01S 7/484* | (2006.01) |
| *G01S 7/497* | (2006.01) |

(52) U.S. Cl.
CPC ............ *G01S 17/04* (2020.01); *G01S 7/4817* (2013.01); *G01S 7/497* (2013.01); *G01S 7/484* (2013.01)

(58) Field of Classification Search
CPC ........ G01S 17/04; G01S 7/4817; G01S 7/497; G01S 7/484; G01S 7/4814; G01S 17/42; G01S 17/89
See application file for complete search history.

(56) References Cited

U.S. PATENT DOCUMENTS

| | | | |
|---|---|---|---|
| 2018/0059248 A1* | 3/2018 | O'Keeffe | G01S 17/42 |
| 2018/0113200 A1* | 4/2018 | Steinberg | G02B 26/0858 |
| 2019/0391271 A1* | 12/2019 | Goodwill | G01S 17/10 |
| 2021/0356589 A1* | 11/2021 | Mahara | G01S 7/4817 |
| 2022/0003846 A1* | 1/2022 | Massoud | G01S 7/484 |
| 2022/0187471 A1* | 6/2022 | Eshel | G01S 7/4814 |
| 2023/0028749 A1* | 1/2023 | Russ | G01S 7/4817 |
| 2023/0038038 A1* | 2/2023 | Mielke | G01S 7/484 |

* cited by examiner

*Primary Examiner* — Yuqing Xiao
*Assistant Examiner* — Chia-Ling Chen
(74) *Attorney, Agent, or Firm* — BAYES PLLC

(57) ABSTRACT

Embodiments of the disclosure provide a system for controlling an emission of laser beams using a plurality of scanning patterns by an optical sensing device. The plurality of scanning patterns interleavingly cover a field of view of the optical sensing device. The system includes a controller that is configured to detect an object within a functional distance range from the optical sensing device based on a reflected first laser beam received by the optical sensing device. The first laser beam is emitted towards a first scanning point in a first scanning pattern. The controller is also configured to determine an aperture extending from the first scanning point, and control the optical sensing device to emit a second laser beam towards a second scanning point in a second scanning pattern and skip the scanning points between the first scanning point and the second scanning point in the aperture.

19 Claims, 18 Drawing Sheets

100

300

LATERAL
SCANNING
DIRECTION

VERTICAL
SCANNING
DIRECTION

300

300

LATERAL
SCANNING
DIRECTION

VERTICAL
SCANNING
DIRECTION

300

LATERAL
SCANNING
DIRECTION

VERTICAL
SCANNING
DIRECTION

300

LATERAL
SCANNING
DIRECTION

VERTICAL
SCANNING
DIRECTION

DYNAMIC LASER EMISSION CONTROL IN LIGHT DETECTION AND RANGING (LIDAR) SYSTEMS

TECHNICAL FIELD

The present disclosure relates to Light Detection and Ranging (LiDAR) systems, and more particularly to, systems and methods for dynamic laser emission control in the LiDAR systems.

BACKGROUND

Optical sensing systems such as LiDAR systems have been widely used in autonomous driving and producing high-definition maps. For example, a typical LiDAR system measures the distance to a target by illuminating the target with pulsed laser light beams and measuring the reflected pulses with a sensor such as a photodetector. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and/or high-definition map surveys.

A LiDAR system can use a transmitter to transmits a signal (e.g., pulsed laser light) into the surroundings, and use a receiver to collect the returned signal (e.g., laser light reflected by an object in the surroundings). The LiDAR system can then calculate parameters such as the distance between the object and the LiDAR system based on, e.g., the speed of light and the time the signal travels (e.g., the duration of time between the time the signal is transmitted and the time the returned signal is received) and use the parameters to construct 3D maps and/or models of the surroundings. To improve the detection range and the signal-to-noise-ratio (SNR), laser light of high energy is often needed. On the other hand, however, the energy of the signal also needs to be limited to avoid potential harm to eyes. Therefore, it is challenging to balance the performance demands and regulatory safety mandate in LiDAR system development.

Embodiments of the disclosure address the above challenges by providing improved systems and methods for dynamically controlling the laser emission used in LiDAR systems.

SUMMARY

Embodiments of the disclosure provide a system for controlling an emission of laser beams using a plurality of scanning patterns by an optical sensing device. The plurality of scanning patterns interleavingly cover a field of view of the optical sensing device. The system includes a controller that is configured to detect an object within a functional distance range from the optical sensing device based on a reflected first laser beam received by the optical sensing device. The first laser beam is emitted towards a first scanning point in a first scanning pattern. The controller is also configured to determine an aperture extending from the first scanning point, and control the optical sensing device to emit a second laser beam towards a second scanning point in a second scanning pattern and skip the scanning points between the first scanning point and the second scanning point in the aperture.

Embodiments of the disclosure also provide a method for controlling an emission of laser beams using a plurality of scanning patterns by an optical sensing device. The plurality of scanning patterns interleavingly cover a field of view of the optical sensing device. The method includes detecting an object within a functional distance range from the optical sensing device based on a reflected first laser beam received by the optical sensing device. The first laser beam is emitted towards a first scanning point in a first scanning pattern. The method also includes determining an aperture extending from the first scanning point, and controlling the optical sensing device to emit a second laser beam towards a second scanning point in a second scanning pattern and skip the scanning points between the first scanning point and the second scanning point in the aperture.

Embodiments of the disclosure also provide a non-transitory computer-readable medium having instructions stored thereon. When executed by at least one processor, the instructions can cause the at least one processor to perform a method for controlling an emission of laser beams using a plurality of scanning patterns by an optical sensing device. The plurality of scanning patterns interleavingly cover a field of view of the optical sensing device. The method includes detecting an object within a functional distance range from the optical sensing device based on a reflected first laser beam received by the optical sensing device. The first laser beam is emitted towards a first scanning point in a first scanning pattern. The method also includes determining an aperture extending from the first scanning point, and controlling the optical sensing device to emit a second laser beam towards a second scanning point in a second scanning pattern and skip the scanning points between the first scanning point and the second scanning point in the aperture.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
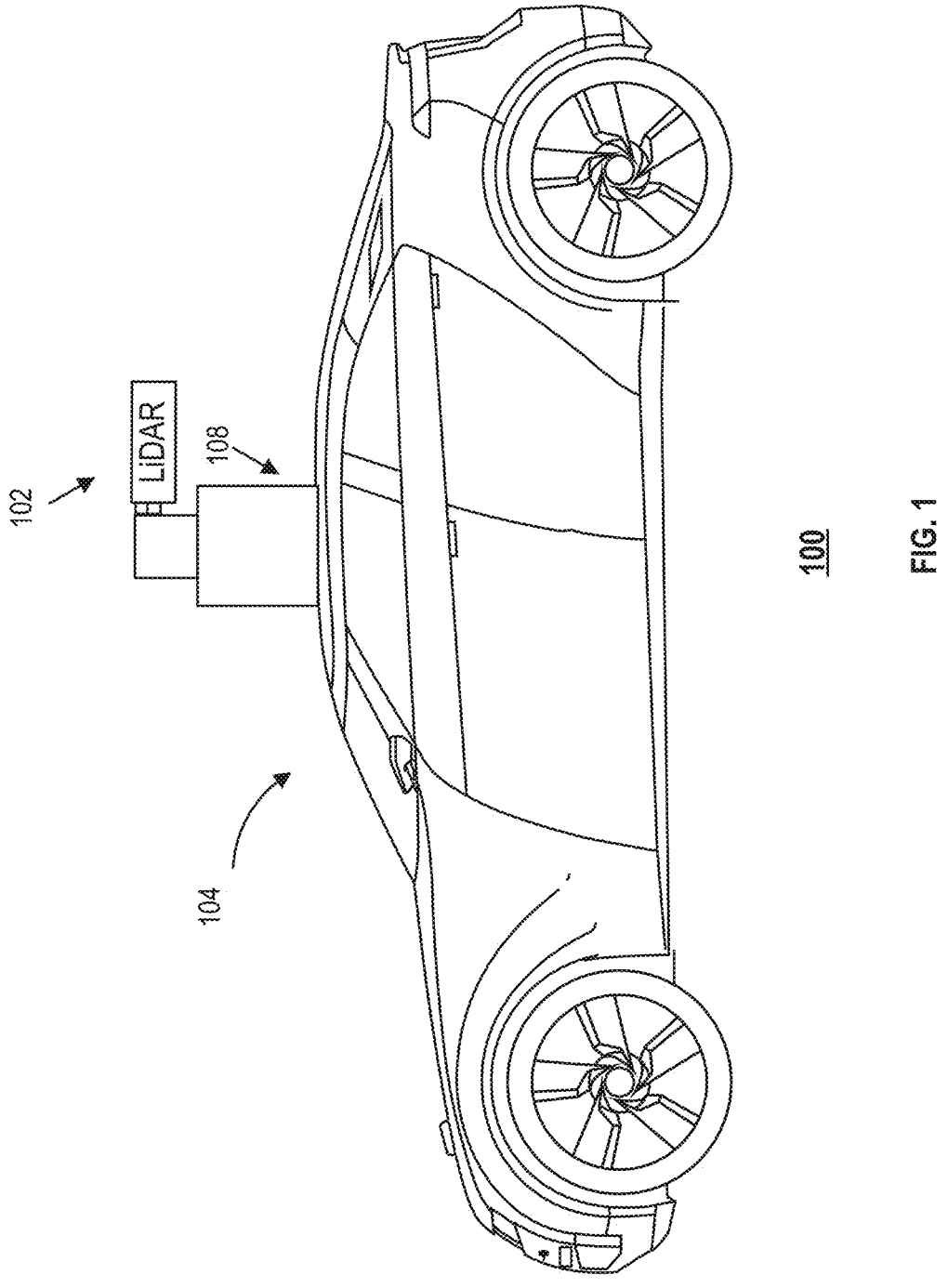
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. As illustrated in FIG. 1, vehicle 100 may be equipped with LiDAR system 102 mounted to body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. It is contemplated that the manners in which LiDAR system 102 can be equipped on vehicle 100 are not limited by the example shown in FIG. 1 and may be modified depending on the types of LiDAR system 102 and/or vehicle 100 to achieve desirable 3D sensing performance.

Consistent with some embodiments, LiDAR system 102 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used by LiDAR system 102 may be ultraviolet, visible, or near infrared. In some embodiments of the present disclosure, LiDAR system 102 may capture point clouds. As vehicle 100 moves along the trajectory, LiDAR system 102 may continuously emit/scan laser beams and receive returned laser beams.

Consistent with the present disclosure, a controller may be included for processing and/or analyzing collected data for various operations. For example, the controller may process received signals and control any operations based on the processed signals. The controller may also communicate with a remote computing device, such as a server (or any suitable cloud computing system) for operations of LiDAR system 102. Components of the controller may be in an integrated device or distributed at different locations but communicate with one another through a network. In some embodiments, the controller may be located entirely within LiDAR system 102. In some embodiments, one or more components of the controller may be located in LiDAR system 102, inside vehicle 100, or may be alternatively in a mobile device, in the cloud, or another remote location.

In some embodiments, the controller may process the received signal locally. In some alternative embodiments, the controller is connected to a server for processing the received signal. For example, the controller may stream the received signal to the server for data processing and receive the processed data (e.g., laser emission scheme(s) for controlling the laser power in an aperture) from the server. In some embodiments, the received signal is processed and the laser emission scheme(s) may be generated in real-time. A distance between the object and LiDAR system 102 may be updated in real-time for the determination of the laser emission scheme(s).

Figure 2A:
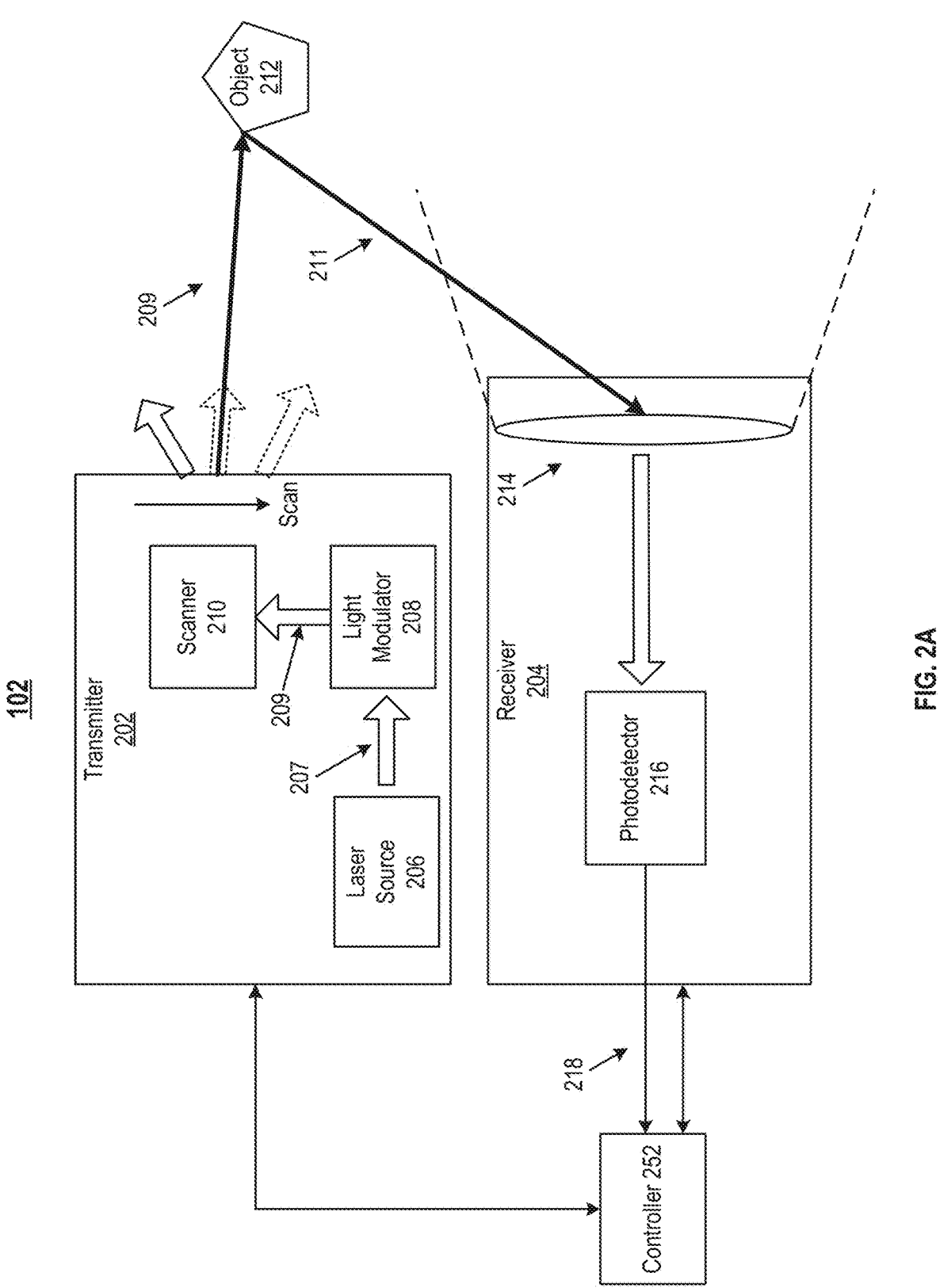
FIG. 2A illustrates a block diagram of an exemplary LiDAR system, according to embodiments of the disclosure.

FIG. 2A illustrates a block diagram of an exemplary implementation of LiDAR system 102, according to embodiments of the disclosure. As shown in FIG. 2A, LiDAR system 102 has a transmitter 202 for emitting a laser beam 209 and a receiver 204 for collecting data of detected laser beams that include a returned laser beam 211 reflected by an object 212. Transmitter 202 may include any suitable light source that emits laser beam 209 outwardly into the surroundings of LiDAR system 102. In some embodiments, laser beam 209 includes a pulsed laser signal with a scanning angle, as illustrated in FIG. 2A.

Transmitter 202 may include any suitable components for generating laser beam 209 of a desired wavelength and/or intensity. For example, transmitter 202 may include a laser source 206 that generates a native laser beam 207 in the ultraviolet, visible, or near infrared wavelength range. Transmitter 202 may also include a light modulator 208 that collimates native laser beam 207 to generate laser beam 209. Scanner 210 can scan laser beam 209 at a desired scanning angle and a desired scanning rate. Each laser beam 209 can form a scanning point on a surface facing transmitter 202 and at a distance from LiDAR system 102. Laser beam 209 may be incident on object 212, reflected back, and collected by a lens 214. Object 212 may be made of a wide range of materials including, for example, live objects, non-metallic objects, rocks, rain, chemical compounds, aerosols, clouds and even single molecules. The wavelength of laser beam 209 may vary based on the composition of object 212. In some embodiments of the present disclosure, scanner 210 may include optical components (e.g., lenses, mirrors) that can focus pulsed laser light into a narrow laser beam to increase the scan resolution.

Receiver 204 may be configured to detect returned laser beam 211 (e.g., returned signals) reflected from object 212. Upon contact, laser light can be reflected by object 212 via backscattering. Receiver 204 can collect returned laser beam 211 and output electrical signal indicative of the intensity of returned laser beam 211. As illustrated in FIG. 2A, receiver 204 may include lens 214 and a photosensor 216 (e.g., a photodetector or a photodetector array). Lens 214 may be configured to collect light from a respective direction in its field of view (FOV).

Photosensor 216 may be configured to detect returned laser beam 211 reflected by object 212. Photosensor 216 may convert the laser light (e.g., returned laser beam 211) collected by lens 214 into a receiver signal 218 (e.g., a current or a voltage signal). Receiver signal 218 may be generated when photons are absorbed in photosensor 216. Receiver signal 218 may be transmitted to a data processing unit, e.g., controller 252 of LiDAR system 102, to be processed and analyzed. Controller 252 may be configured to control transmitter 202 and/or receiver 204 to perform detection/sensing operations.

Receiver signal 218 may include the power data (e.g., an electrical signal) of returned laser beam 211, e.g., converted from the light signal of returned laser beam 211. Returned laser beam 211 may be caused by the reflection of laser beam 209 from object 212 in the FOV of LiDAR system 102. As shown in FIG. 2A, scanner 210 may emit/scan laser beam 209 in various directions towards the surroundings. Laser beam 209 may be incident on object 212 to cause returned laser beam 211 to be formed and reflected back towards LiDAR system 102. Photosensor 216 may receive returned laser beam 211 through lens 214. Photosensor 216 may convert returned laser beam 211 into an electrical signal (e.g., receiver signal 218), which is transmitted to controller 252. Controller 252 may further determine data and/or operations such as the distance of object 212 from LiDAR system 102 and subsequent laser emission scheme(s) of laser beam 209.

To obtain a desired coverage of the surroundings and/or the resolution of the scanning/sensing result, the energy of laser beam 209 needs to be sufficiently high for LiDAR system 102 to have a desirably long detection range. Object 212, far away from LiDAR system 102, can then be detected. Meanwhile, the energy of laser beam 209 should also be controlled below a safety limit to ensure human eyes are not impaired by the scanning. The span of the scanning angles of laser beam 209, e.g., in the 3D space, also needs to be sufficiently large to cover a desired range of the surroundings laterally and vertically. The angular resolution of LiDAR system 102, e.g., the ability of LiDAR system 102 to measure the angular separation of the points, needs to be sufficiently high to ensure desirable spatial resolution for detecting object 212 far away from LiDAR system 102. Scanner 210 may perform two-dimensional scanning to cover the FOV of LiDAR system 102. In some embodiments, scanner 210 may scan laser beam 209 in the 3D space along a lateral scanning direction and a vertical scanning direction, e.g., line by line from left to the right and from top to bottom, at a desired scanning rate. Laser beam 209 may be emitted at various scanning points along the lateral and vertical scanning directions. In some applications, the FOV of LiDAR system 102 is covered with more than one scanning patterns, e.g., to increase angular resolution without increasing the switching frequency of laser source 206. In each frame, LiDAR system 102 may scan all the scanning patterns to cover the entire FOV. Details of the scanning patterns and methods to control laser emission schemes for the scanning patterns are described below.

Controller 252 may determine the distance of object 212 from LiDAR system 102 based on receiver signal 218 and data of laser beam 209. For example, the distance between object 212 and LiDAR system 102 may be calculated based on the speed of light, the scanning angle of laser beam 209, the round-trip travel time of laser beam 209/211 (e.g., from transmitter 202 to object 212 and back to receiver 204), and/or the power of returned laser beam 211 (e.g., the intensity of the light signal converted by photosensor 216 to receiver signal 218). Controller 252 may sense object 212 and adjust the laser emission scheme of laser beam 209 when the distance between object 212 and LiDAR system 102 is equal to or less than a distance tolerance value (e.g., a distance below which unadjusted emission scheme of laser beam 209 in subsequent emissions would cause potential harm when object 212 is a human being or otherwise pose safety concerns). For example, to reduce or avoid the potential harm to human eyes, the laser emission scheme, after the adjustment, can cause the total power incident on an area covering the size of a human pupil at the distance to be no higher than (e.g., lower than or equal to) a predetermined safety limit. In some embodiments, the adjustment of laser emission scheme is performed in real-time or near real-time. For example, if the distance between object 212 and LiDAR system 102 changes, controller 252 may dynamically adjust the laser emission scheme to ensure the total power incident on the area at the changed distance is less than the predetermined safety limit. For example, if distance decreases, controller 252 may adjust the laser emission scheme so that the total power to be incident on the area does not exceed the predetermined safety limit. Functions of controller 252 for the determination of the distance or other triggers related to the potential harm and the adjustment of laser emission scheme of laser beam 209 are described in greater detail in connection with FIG. 2B.

Figure 2B:
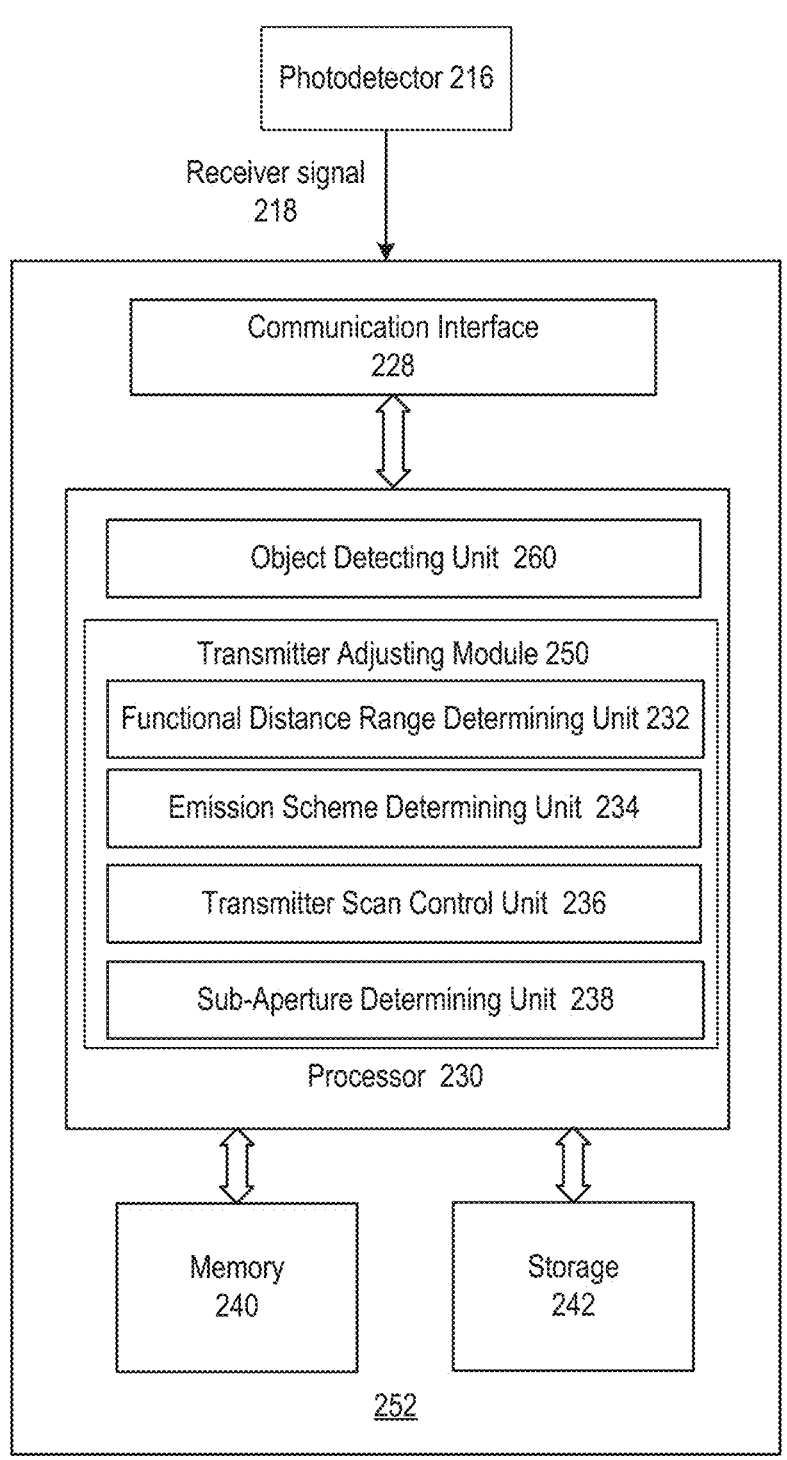
FIG. 2B illustrates a block diagram of an exemplary controller for controlling laser emission in a LiDAR system, according to embodiments of the disclosure.

FIG. 2B shows an exemplary implementation of controller 252, according to embodiments of the disclosure. Consistent with the present disclosure, controller 252 may receive receiver signal 218 (e.g., containing power data of returned laser beam 211) from photosensor 216.

In some embodiments, as shown in FIG. 2B, controller 252 may include a communication interface 228, a processor 230, a memory 240, and a storage 242. In some embodiments, controller 252 may have different modules in a single device, such as an integrated circuit (IC) chip (implemented as, for example, an application-specific integrated circuit (ASIC) or a field-programmable gate array (FPGA)), or separate devices with dedicated functions. In some embodiments, one or more components of controller 252 may be located in a cloud, or may be alternatively in a single location (such as inside vehicle 100 or a mobile device) or distributed locations. Components of controller 252 may be in an integrated device, or distributed at different locations but communicate with each other through a network.

Communication interface 228 may send data to and receive data from components such as photosensor 216 via wired communication methods, such as Serializer/Deserializer (SerDes), Low-voltage differential signaling (LVDS), Serial Peripheral Interface (SPI), etc. In some embodiments, communication interface 228 may optionally use wireless communication methods, such as a Wireless Local Area Network (WLAN), a Wide Area Network (WAN), wireless communication links such as radio waves, a cellular network, and/or a local or short-range wireless network (e.g., Bluetooth™), etc. Communication interface 228 can send and receive electrical, electromagnetic or optical signals that carry digital data streams representing various types of information.

Consistent with some embodiments, communication interface 228 may receive receiver signal 218 (e.g., containing data of returned laser beam 211). In some embodiments, communication interface 228 may sequentially receive receiver signals 218 as scanner 210 continues to scan laser beams 209 at the scanning rate. Communication interface 228 may transmit the received receiver signal 218 to processor 230 for processing.

Processor 230 may include any appropriate type of general-purpose or special-purpose microprocessor, digital signal processor, or microcontroller. Processor 230 may be configured as a stand-alone processor module dedicated to analyzing signals (e.g., receiver signal 218) and/or controlling the scan schemes. Alternatively, processor 230 may be configured as a shared processor module for performing other functions unrelated to signal analysis/scan scheme control.

In many LiDAR systems with laser wavelengths in near-infrared range, laser energy is strictly regulated due to its potential damage to human eyes. According to laser safety standards, e.g., the International Standard IEC 60285-1, the energy of a laser pulse (e.g., at a non-pulse-train mode) needs to meet a criterion described as $E_{pulse} \leq AEL_{Class\ 1}$, in which $E_{pulse}$ is the energy of the laser pulse/beam and $AEL_{Class\ 1}$ is the accessible emission limit for Class 1 laser product. If the laser pulse is in a pulse train mode, in which the laser pulses are emitted continuously, the energy of a laser pulse needs to meet criteria described as $E_{pulse} \leq AEL_{Class\ 1} \times C_5$, in which $C_5$ represents a correction factor related to the pulse number (N) in T2, T2 being about 10 seconds for near-infrared laser pulses. If N is much higher than the upper limit of laser pulses emitted (e.g., 600) in T2, $C_5$ is set to be equal to 0.4. That is, in a pulse train mode, the energy of each pulse should be reduced to its original value (e.g., the value for non-pulse-train mode). A conventional approach to solve this problem for laser pulses emitted in the pulse train mode is, consistent with the criteria described above, reducing the energy of each laser pulse to 40% of its original value. For high resolution and long-range LiDAR systems, this becomes detrimental because the reduction of laser power can lead to a shorter detection range.

The present disclosure provides systems and methods for dynamically reducing the number (or angular resolution) of laser beams scanned towards an object when the object is detected to be at a short distance from the LiDAR system, which has a FOV covered by a plurality of scanning patterns. Using the disclosed systems and methods, the energy of a laser beam/pulse does not need to be reduced even when the LiDAR system is in a pulse train mode. When LiDAR system is scanning the FOV using one of the scanning patterns and object 212 is detected to be in the short distance, the LiDAR system (e.g., via the controller) may determine an aperture, which covers the size of a human pupil, and adjust the laser emission scheme to a low-resolution emission scheme in the aperture, to ensure the total energy of the laser beams to be incident on the aperture does not exceed the predetermined safety limit (details of calculation provided below). In some embodiments, according to the low-resolution emission scheme, the laser beam is not scanned towards the aperture for the current scanning pattern. The LiDAR system scans laser beams using a high-resolution emission scheme outside the aperture. If no object is detected at a short distance, the LiDAR system may continue to scan laser beams using the high-resolution emission scheme. As a result, without reducing the energy of the laser beam, the disclosed systems and methods ensure the human eye to be less susceptible to harm caused by the LiDAR system. Details of the embodiments are described in greater detail as follows.

As shown in FIG. 2B, processor 230 may include multiple functional units or modules that can be implemented using software, hardware, middleware, firmware, or any combination thereof. For example, processor 230 may include an object detecting unit 260, a transmitter adjusting module 250, or the like. In some embodiments, transmitter adjusting module 250 includes a functional distance range determining unit 232, an emission scheme determining unit 234, a transmitter scan control unit 236, and a sub-aperture determining unit 238. In some embodiments, processor 230 determines the laser emission scheme based on receiver signal 218 to ensure the total energy of laser pulses to be incident on the aperture is below the predetermined safety limit. Specifically, if object 212 is determined to be within a functional distance range, processor 230 may switch the laser emission to a low-resolution emission scheme, ensuring the total energy incident on the aperture does not exceed the predetermined safety limit; if object 212 is determined to be beyond the functional distance range, processor 230 may maintain the high-resolution emission scheme.

Figure 3A:
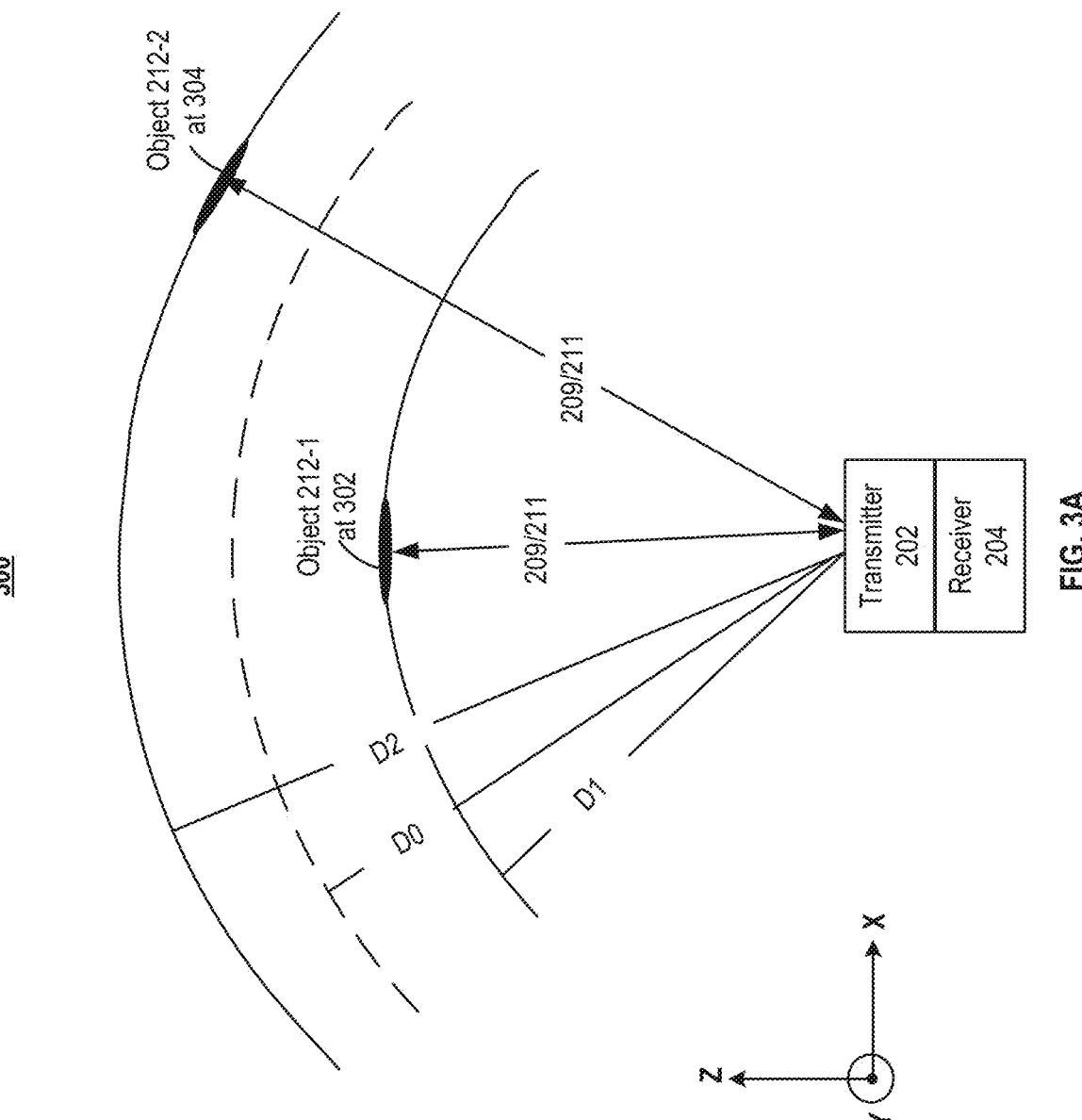
FIG. 3A illustrates detection of objects in a field of view (FOV) of an exemplary LiDAR system, according to embodiments of the disclosure.
Figure 3B:
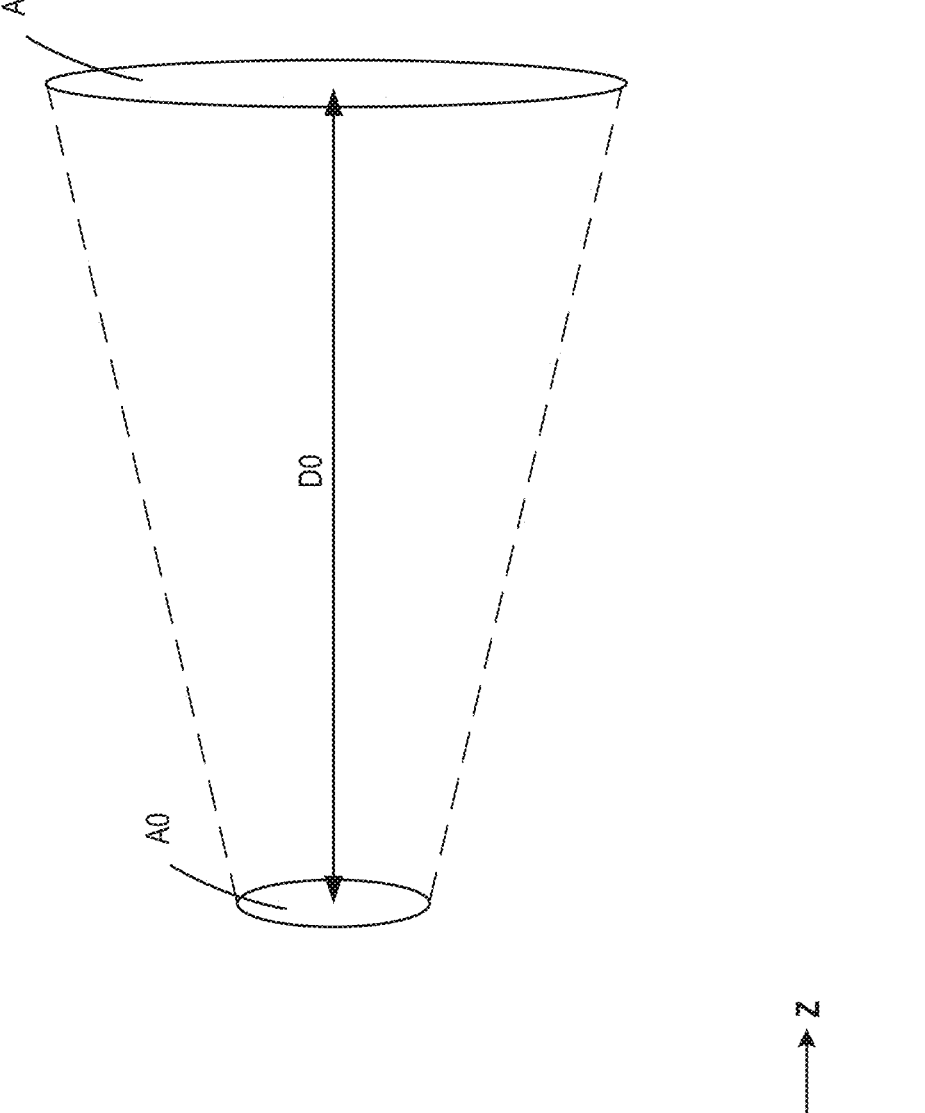
FIG. 3B illustrates variation of a size of a laser beam versus a travel distance in a FOV of an exemplary LiDAR system, according to embodiments of the disclosure.
Figure 3C:
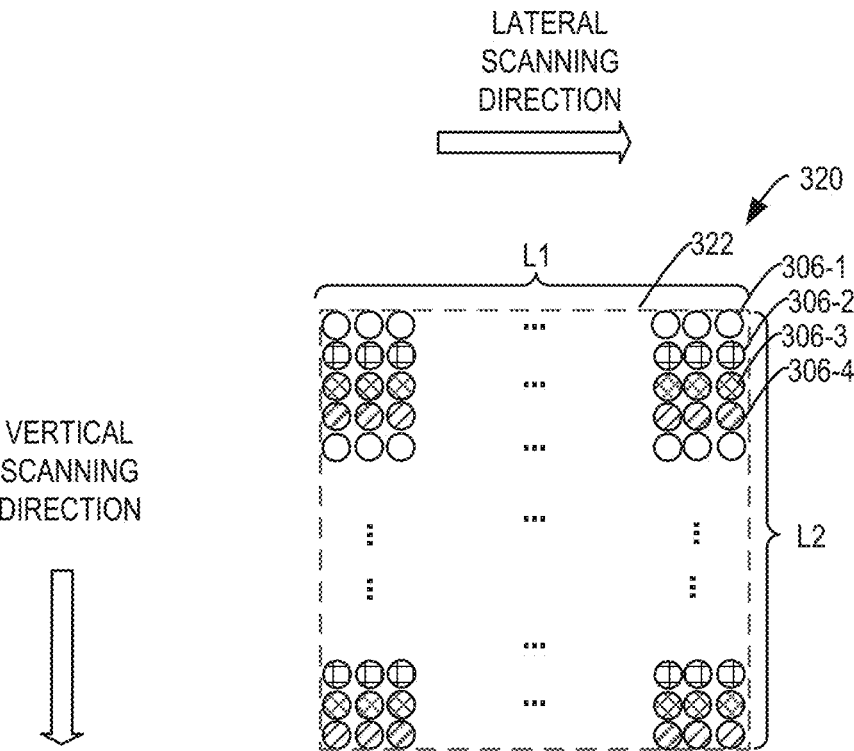
FIG. 3C illustrates an exemplary emission scheme of a LiDAR system, according to embodiments of the disclosure.
Figure 3C:
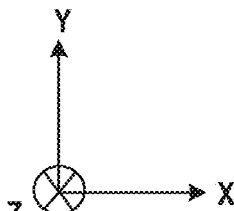
Figure 3D:
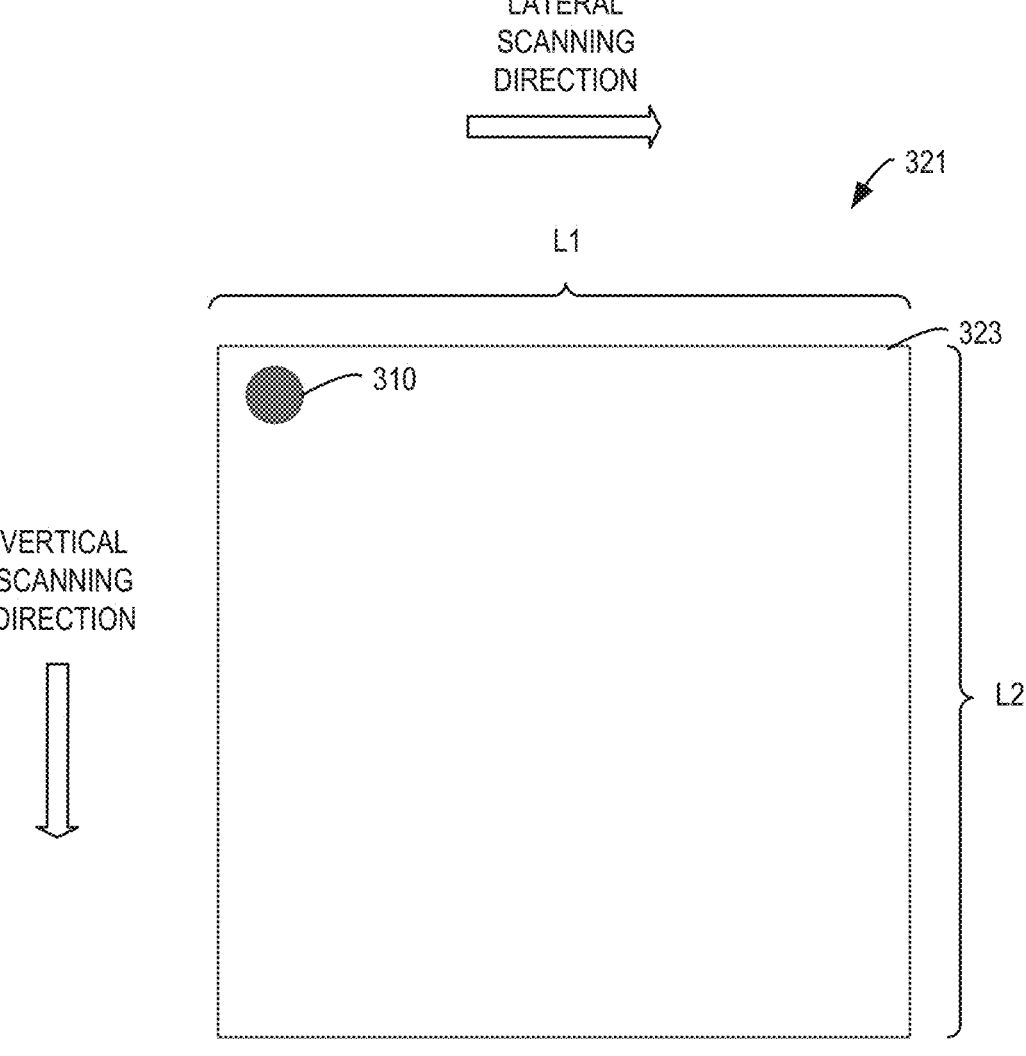
FIG. 3D illustrates another exemplary emission scheme of a LiDAR system, according to embodiments of the disclosure.
Figure 3D:
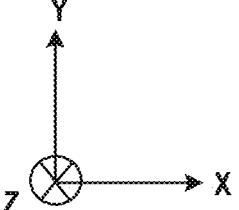
Figure 3E:
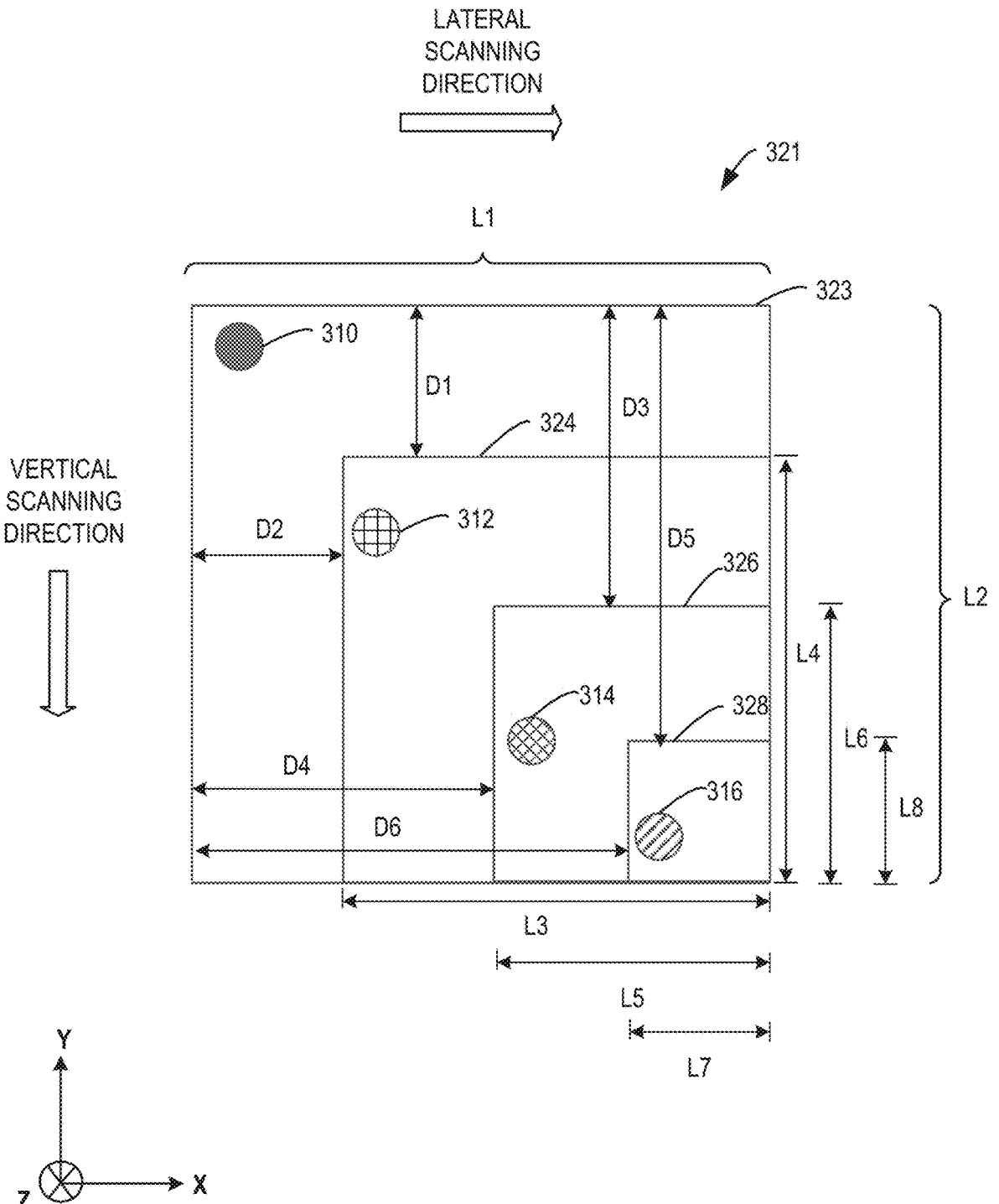
FIG. 3E illustrates sub-apertures in an aperture, according to embodiments of the disclosure.

For ease of illustration, FIGS. 3A-3E are described together with FIG. 2B. FIG. 3A illustrates an exemplary FOV 300 of LiDAR system 102, according to embodiments of the present disclosure. FIG. 3B illustrates a size change of laser beam 209 during propagation, according to embodiments of the present disclosure. FIGS. 3C and 3D each illustrates an exemplary laser emission scheme, according to embodiments of the present disclosure. FIG. 3E illustrates sub-apertures in a more-recently determined aperture, according to embodiments of the present disclosure.

Object detecting unit 260 may determine whether object 212 is subject to potential harm by laser beam 209 and send an alert signal to transmitter adjusting module 250 after determining that object 212 is subject to potential harm. Transmitter adjusting module 250 may adjust the laser emission scheme accordingly. In some embodiments, object detecting unit 260 also sends to transmitter adjusting module 250 any data that can be used for the adjustment of laser emission scheme, such as the distance between object 212 and LiDAR system 102. In some embodiments, object detecting unit 260 determines object 212 is in the FOV of LiDAR system 102 based on receiver signal 218. Object detecting unit 260 may determine the distance between object 212 and LiDAR system 102 based on, e.g., the round-trip travel time of laser beams 209 and 211 and the scanning angle of scanner 210.

Object detecting unit 260 may compare, e.g., in real-time, the distance between LiDAR system 102 and object 212 with a distance tolerance value. For example, when the distance between LiDAR system 102 and object 212 is greater than the distance tolerance value, it may be determined that no harm can be caused by laser beam 209. On the other hand, when object detecting unit 260 determines that the distance between LiDAR system 102 and object 212 is equal to or less than the distance tolerance value, object detecting unit 260 may send an alert signal to transmitter adjusting module 250 to warn the potential risk. The distance tolerance value may be the upper limit of a functional distance range, and may be determined by functional distance range determining unit 232. Details of the functional distance range is described below.

Functional distance range determining unit 232 may determine a distance tolerance value which is the upper limit of a functional distance range. When the distance between object 212 and LiDAR system 102 is detected to be shorter than the distance tolerance value, object 212 may be determined to be in the functional distance range; when the distance between object 212 and LiDAR system 102 is detected to be greater than the distance tolerance value, object 212 may be determined to be beyond the functional distance range. As shown in FIG. 3A, controller 252 (not shown) may control transmitter 202 to scan laser beam 209 from transmitter 202 into FOV 300 of LiDAR system 102. Controller 252 may control transmitter 202 to scan laser beam 209 along various directions/angles within FOV 300 of LiDAR system 102. In some embodiments, transmitter 202 (e.g., via scanner 210) may scan laser beam 209 along a lateral scanning direction (e.g., the x-direction) and a vertical scanning direction (e.g., the y-direction). In an example, the scanning angle of laser beam 209 may include a vertical scanning angle and a lateral scanning angle. The vertical scanning angle may represent the direction of laser beam 209 with respect to the vertical direction (e.g., they-direction), and the lateral scanning angle may represent the direction of laser beam 209 with respect to a lateral direction (e.g., the x-direction). At a given lateral scanning angle, transmitter 202 may incrementally change the vertical scanning angle of laser beam 209 by a vertical delta angle so one laser beam 209 and an immediately-subsequent laser beam 209 may be separated from each other by the vertical delta angle. The vertical delta angle may be any suitable value such as 0.01°, 0.02°, 0.05°, 0.1°, 0.2°, 0.5°, 1°, and the like. In some embodiments, transmitter 202 scans laser beam 209 from top to bottom in the 3D space at each lateral scanning angle. After scanning laser beam 209 at one lateral scanning angle, transmitter 202 may scan laser beam 209 from top to bottom in the 3D space at another lateral scanning angle, which may form a lateral delta angle with the previous lateral scanning angle. The lateral delta angle may be any suitable value such as $0.01°$, $0.02°$, $0.05°$, $0.1°$, $0.2°$, $0.5°$, $1°$, and the like. In some embodiments, laser beam 209 is scanned in lines along the vertical scanning direction (referred to as "columns") and in lines along the lateral scanning direction (referred to as "rows"). The rows and columns are perpendicular to each other in FOV 300.

In some embodiments, transmitter 202 repeatedly scans laser beam 209 vertically and laterally to cover FOV 300. Laser beam 209 may be emitted along its respective scanning direction within FOV 300 at the time it is being scanned. At any location in FOV 300, in a vertical plane facing laser beam 209, the scanning pattern of laser beams 209 may be formed by a plurality of scanning points, each scanning point corresponding to the position the scanned laser beam 209 intersects with the vertical plane. In other words, laser beams 209 emitted or to be emitted along a plurality of angles may be projected to the vertical plane to form the plurality of scanning points. In some embodiments, at a desired scanning rate, transmitter 202 may scan laser beam 209 a plurality of times (e.g., at different vertical scanning angles) at one lateral scanning angle before moving to the next lateral scanning angle. In some embodiments, transmitter 202 may scan laser beam 209 a plurality of times (e.g., at different lateral scanning angles) at one vertical scanning angle before moving to the next vertical scanning angle. In some embodiments, the lateral scanning angle, the vertical scanning angle, the lateral delta angles, the vertical delta angles, the scanning rate, and/or divergence characteristics of laser beam 209 may be used to determine the spatial/geometric distribution of laser beam 209 in the 3D space and the distribution of scanning points at any suitable surface/location.

In some embodiments, controller 252 may control transmitter 202 to scan laser beam 209, into FOV 300, in a plurality of scanning patterns in one frame. Each scanning pattern may include a plurality (e.g., an array) of scanning points distributed in FOV 300, which is then filled/covered with the scanning points of all scanning patterns. In some embodiments, the scanning patterns are interleavingly distributed in the 3D space. For example, in one frame, controller 252 may scan a first scanning pattern into FOV 300, and scan a second scanning pattern into the unscanned 3D space in FOV 300 after the scanning of the first scanning pattern is completed. Controller 252 may continue to scan until all the scanning patterns are scanned, in a single frame, to cover FOV 300. The scanning patterns can be scanned in the same or different scanning directions. In some embodiments, the scanning points of different scanning patterns do not overlap with one another in the 3D space, and a delta angle (e.g., lateral and/or vertical) between adjacent scanning points (e.g., of different scanning patterns) may be desirably small to ensure a sufficiently-high angular resolution can be obtained in FOV 300. In various embodiments, the number of scanning patterns may be a suitable integer such as between 2 and 10. In some embodiments, the number may be less than or equal to 6. In an example, the number is equal to 4. Details of the exemplary scanning patterns in FOV 300 will be described in FIG. 3C.

Each scanning point may propagate and diverge in the 3D space of FOV 300. As shown in FIG. 3A, D0 represents the distance tolerance value, which is the upper limit of functional distance range from transmitter 202. If object 212 is detected to be at a location 302, of which the distance to transmitter 202 is smaller than distance tolerance value D0, object 212 is determined to be in the functional distance range. If object 212 is detected to be at a location 304, of which the distance to transmitter 202 is greater than distance tolerance value D0, object 212 is detected to be beyond the functional distance range.

Functional distance range determining unit 232 may determine distance tolerance value D0. As previously described, in a pulse train mode, the energy of each laser pulse conventionally needs to be reduced to 40% of its original value (e.g., by multiplying correction factor $C_5$) to ensure the total energy of all laser pulses incident on an aperture that covers the size of a pupil does not exceed the predetermined safety limit. In the present application, when object 212 is detected to be in the functional distance range, instead of reducing energy of laser beam 209, controller 252 may maintain the original energy of each laser beam 209 and reduce the number of pulses/scanning points towards the aperture such that the total energy of laser beam 209 incident on the aperture does not exceed the predetermined safety limit. In some embodiments, the unscanned scanning points of the current scanning pattern in the aperture, other than the current scanning point at which object 212 is detected in the functional distance range, are skipped during the scanning of the current scanning pattern. Functional distance range determining unit 232 may determine distance tolerance value D0 based on the divergence characteristics of laser beam 209. In some embodiments, functional distance range determining unit 232 determines the value of distance tolerance value D0. At distance tolerance value D0, even if the number of pulses/scanning points is not reduced, the total energy incident on a human eye (or the aperture) would not amount to a harmful level. In some embodiments, functional distance range determining unit 232 is an optional part of processor 230, and distance tolerance value D0 is a predetermined value and stored in controller 252 (e.g., in memory 240 and/or storage 242). For example, D0 may be an unchanged value determined prior to the scanning process. In some embodiments, the divergence characteristics of laser beam 209 is determined during the design of LiDAR 102, and distance tolerance value D0 is determined, e.g., to be a fixed value, during the design. In operation, processor 230 may access memory 240 and/or storage 242, obtain distance tolerance value D0, and employ distance tolerance value D0 in calculations.

As shown in FIG. 3B, laser beam 209 may propagate in the z-direction during the two-dimensional scanning. A beam size (e.g., an area) of laser beam 209 in the x-y plane (e.g., a vertical plane facing laser beam 209) may increase as laser beam 209 travels away from transmitter 202 due to the divergence characteristics of laser beam 209. Assuming the beam size of laser beam 209 is A0 at transmitter 202 and A1 at distance tolerance value D0, A1 is greater than A0. A0 may be assumed to be comparable to, e.g., equal to or greater than the size/area of a human pupil. When A1 increases to 2.5 times of A0 (e.g., $A1/A0=2.5$), the laser energy per area at A1 is 40% of that at A0. That is, even without reducing any scanning points, the total energy incident on a human eye at distance tolerance value D0 is reduced to 40% of that at transmitter 202 for each pulse. In other words, if the distance between object 212 and transmitter 202 is at least D0, object 212 is not susceptible to harm by laser beam 209 even with no energy reduction or skipped scanning points. Distance tolerance value D0, as determined by functional distance range determining unit 232, may then have a value at which the value of A1 is 2.5 times the value of A0.

Emission scheme determining unit 234 may determine the laser scanning scheme at which laser beam 209 is scanned into FOV 300. Specifically, emission scheme determining unit 234 may determine the emission scheme of laser beam 209 when object 212 is detected to be in the functional distance range. The emission scheme may ensure the total energy of laser beam 209 to be incident on a human eye does not exceed the predetermined safety limit before laser beam 209 propagates to the upper limit of functional distance range. The predetermined safety limit for the energy of the aperture, as determined by emission scheme determining unit 234, may be calculated as the total energy incident on the aperture in the function distance with the minimum number of scanning points of all scanning patterns for a high-resolution scan and 40% pulse energy. For example, emission scheme determining unit 234 may assume laser beam 209 is scanned at a minimum number of scanning points towards the aperture covering a human pupil (e.g., a 7-mm circular area) in T2 (e.g., 10 seconds). In some embodiments, emission scheme determining unit 234 determines the minimum number of scanning points (e.g., of all scanning patterns in one frame) to be 600. Assuming the frame rate of LiDAR system 102 is 10 frames per second (fps), the predetermined safety limit may then be equal to the total energy of laser beam 209, at its original energy and 6 scanning points per frame, towards the aperture. Emission scheme determining unit 234 may determine an emission scheme that includes up to six scanning points distributed in the aperture that covers the 7-mm circular area in one frame. In some embodiments, the number of scanning patterns in one frame is 4, and at most one scanning point of each scanning pattern is determined to be in the aperture in the frame. In some embodiments, the aperture has a 7×7 mm square shape in a two-dimensional scanning that has a lateral scanning direction and a vertical scanning direction. In some other embodiments, the aperture can be determined based on the scanning directions and may have other shapes such as a rectangular shape or a circular shape.

In some embodiments, FOV 300 is covered with scanning points of a plurality of scanning patterns. The total energy in the aperture may include the energy of laser beam 209 at scanning points of all the scanning patterns in a frame. Assuming FOV 300 is covered with a first scanning pattern, a second scanning pattern, a third scanning pattern, and a fourth scanning pattern arranged in an interleaving order. Controller 252 may scan the four scanning patterns consecutively in this order. When object 212 is detected to be in the functional distance range at a scanning point of the first scanning pattern, the rest of the scanning points of the first scanning pattern in a first aperture, extending from the scanning point, are skipped. The next scanning point to be scanned in the aperture may be a first scanning point of the second scanning pattern in a sub-aperture of the first aperture. If object 212 is detected to be in the functional distance range at a scanning point of the second scanning pattern in the sub-aperture, a second aperture is determined extending from the scanning point of the second scanning pattern, and the rest of the scanning points of the second scanning pattern in the second aperture are skipped. If object 212 is not detected to be in the functional distance range at a scanning point of the second scanning pattern, the next scanning point of the second scanning pattern in the sub-aperture is scanned with no skipped scanning points. Controller 252 may resume the scanning of the third and fourth scanning patterns using the same criteria as for the first and second scanning patterns. If object 212 is detected to be in the functional distance range at the first scanning point of each of the second, third, and fourth scanning patterns in the first aperture, the maximum number scanning points in the first aperture is four. That is, if object 212 is detected to be in the functional distance range in an aperture, laser beam 209 may be scanned at no more than 4 (e.g., the total number of scanning patterns) scanning points per frame in the aperture, assuming the frame rate of LiDAR system 102 is 10 fps. By reducing the number of scanning points to scan the FOV, the risk to harm a human eye in the area covered by the aperture is therefore minimized. Meanwhile, if object 212 is not continuously detected to be in the functional distance range in an aperture, scanning points may not be skipped for the rest of the aperture until object 212 is detected. The number of skipped scanning points can be minimized, according to the present disclosure, and the angular resolution of LiDAR system 102 can be maximized.

FIG. 3C illustrates part of an exemplary emission scheme 320 according to which laser beam 209 is emitted when no object 212 is detected to be in the functional distance range at any scanning point, according to embodiments. The frame rate of LiDAR system 102 is assumed to be 10 fps. Emission scheme 320 may be referred to as a high-resolution emission scheme. As shown in FIG. 3C, emission scheme 320 includes a plurality of scanning points 306-1, 306-2, 306-3, and 306-4 distributed continuously (e.g., with no skipped scanning points) in the lateral scanning direction and the vertical scanning direction. Specifically, scanning points 306-1 form a first scanning pattern, scanning points 306-2 form a second scanning pattern, scanning points 306-3 form a third scanning pattern, and scanning points 306-4 form a fourth scanning pattern. The first, second, third, and fourth scanning patterns are distributed interleavingly in the vertical scanning direction (e.g., they-direction) in FOV 300. In some embodiments, controller 252 scans the first, second, third, and fourth scanning patterns in this order. For example, in the vertical scanning direction, controller 252 may scan scanning points 306-1 in a column when scanning the first scanning pattern, and scan scanning points 306-2 in the column when scanning the second scanning pattern, and so on for the third and fourth scanning patterns. When all four scanning patterns are scanned at the end of a frame, scanning points 306-1, 306-2, 306-3, and 306-4 may cover FOV 300 in the interleaving order, as shown in FIG. 3C. The scanning points in each scanning pattern may be scanned along the same or different scanning directions. No object 212 is detected in the functional distance range by the scan performed at any of scanning points 306-1, 306-2, 306-3, and 306-4, as shown in FIG. 3C. In an example, controller 252 may apply emission scheme 320 when object 212 is detected at location 304 (e.g., beyond functional distance range D0). In another example, controller 252 may apply emission scheme 320 when or no object 212 is detected at all (e.g., either at location 302 or location 304).

FIG. 3D illustrates an exemplary emission scheme 321 according to which laser beam 209 is emitted when object 212 is detected to be in the functional distance range at a scanning pattern, according to some embodiments. Emission scheme 321 may be referred to as a low-resolution emission scheme. As shown in FIG. 3D, scanning point 310 represents a scanning point at which object 212 is detected in the functional distance range and emission scheme 321 may include one scanning point (e.g., scanning point 310 or the current scanning point) in an aperture 323 extending from (e.g., covering) scanning point 310 at the current scanning pattern. Scanning point 310 may be an example of any one of scanning points 306-1, 306-2, 306-3, and 306-4 shown in FIG. 3C. That is, at the current scanning pattern, scanning point 310 may be the first and only scanning point in aperture 323 and laser beam 209 may not be scanned at any other scanning point in aperture 323 along the scanning directions. In other words, when object 212 is detected in the functional distance range at any of the first, second, third, and fourth scanning patterns, the rest of the scanning points of the current scanning pattern may be skipped in aperture 323. Aperture 323 may extend from (e.g., cover) scanning point 310, and along the two-dimensional scanning directions, e.g., lateral and vertical scanning directions. The area/size of aperture 323 is sufficient to cover the area of a human pupil, which is often considered as a 7-mm circular area. In some embodiments, aperture 323 has a square shape that can cover the 7-mm circular area and includes least skipped scanning points in a frame. For example, a lateral dimension L1 of aperture 323 may be about 7 mm, and a vertical dimension L2 of aperture 323 may be about 7 mm. In an example, controller 252 may apply emission scheme 321 for the current scanning pattern when object 212 is detected at location 302 based on returned laser beam 211 at scanning point 310.

For ease of illustration, referring back to FIG. 3C, an aperture 322 is depicted to have the same shape and dimensions as aperture 323 FIG. 3D. As shown in FIGS. 3C and 3D, one or more scanning points of the same pattern along lateral scanning direction and/or vertical scanning direction are skipped in aperture 323. That is, in the same area (e.g., the area covered by aperture 323), the total number (e.g., one) of scanning points (306-1, 306-2, 306-3, 306-4) of a single scanning pattern is reduced. In one frame, the total number of scanning points in aperture 323 is a subset of the total number of scanning points in aperture 322.

Referring back to FIG. 2B, transmitter scan control unit 236 may determine the emission scheme applied by transmitter 202. For each scanning point, after receiving the alert signal from object detecting unit 260, transmitter scan control unit 236 may determine whether the current emission scheme needs to be changed or maintained. In an example, if LiDAR system 102 is scanning FOV 300 according to a scanning pattern of emission scheme 320 and the alert signal suggests object 212 is detected in the functional distance range at the current scanning point, transmitter scan control unit 236 may control transmitter 202 to start scanning laser beam 209 using emission scheme 321 from one or more unscanned scanning points for the current scanning pattern, e.g., skipping the rest of the scanning points of the current scanning pattern in the most-recently determined aperture. In another example, if LiDAR system 102 is scanning laser beam 209 towards a most-recently determined aperture and the alert signal suggests no object 212 is detected in the functional distance range at the current scanning point of the current scanning pattern, transmitter scan control unit 236 may control transmitter 202 to scan laser beam 209 using emission scheme 320 until object 212 is detected in the functional distance range. In some embodiments, if object 212 is detected in the functional distance range at the current scanning point, transmitter scan control unit 236 also controls transmitter 202 to scan laser beam 209 using emission scheme 320 outside the aperture.

Sub-aperture determining unit 238 may determine a sub-aperture of the most-recent aperture for the scanning of the next scanning pattern. The size/area of the sub-aperture is smaller than the size/area of the aperture. For example, if object 212 is detected at a scanning point in the functional distance range during the scanning of a first scanning pattern, transmitter scan control unit 236 may apply emission scheme 321 from the scanning point by skipping the rest of the scanning points of the first scanning pattern, in the aperture extending from the first scanning point. For the scanning of the second scanning pattern, e.g., the scanning pattern immediately-subsequent to the first scanning pattern, sub-aperture determining unit 238 may determine a sub-aperture of the aperture, and transmitter scan control unit 236 may control transmitter 202 to start scanning laser beam 209 from the first scanning point of the second scanning pattern, along the scanning directions, in the sub-aperture. Transmitter scan control unit 236 may control transmitter 202 to scan laser beam 209 towards scanning points of the second scanning pattern according to emission scheme 320 in the sub-aperture, and adjust to emission scheme 321 if object 212 is detected in the functional distance range in the sub-aperture or outside the aperture. If no object 212 is detected in the functional distance range in the sub-aperture, when scanning the second scanning pattern, sub-aperture determining unit 238 may determine a second sub-aperture of the aperture when the third scanning pattern is being scanned. The third scanning pattern may be immediately subsequent to the second scanning pattern. The size/area of the second sub-aperture is smaller than the size/area of the sub-aperture. Transmitter scan control unit 236 may control transmitter 202 to start scanning laser beam 209 from the first scanning point of the third scanning pattern, along the scanning directions, in the second sub-aperture.

FIG. 3E illustrates an aperture, a sub-aperture, a second sub-aperture, and a third sub-aperture, according to some embodiments. As described previously, scanning point 310 represents a scanning point (of the first scanning pattern) at which object 212 is detected in the functional distance range, and aperture 323 extends from scanning point 310. For ease of illustration, assuming scanning point 310 is scanned in the first scanning pattern, and aperture 323 covers only one scanning point 310 of the first scanning pattern.

Sub-aperture 324 (e.g., a first sub-aperture) may be positioned in aperture 323 and may have a smaller size/area than aperture 323. Scanning point 312 represents the first scanning point of the second scanning pattern in sub-aperture 324. In some embodiments, sub-aperture 324 is determined by skipping one or more rows and/or columns of scanning points, of the second scanning pattern, along the scanning directions in aperture 323. In some embodiments, along the vertical scanning direction, the first boundary (e.g., the upper boundary) of sub-aperture 324 may be apart from the first boundary (e.g., the upper boundary) of aperture 323 by a distance D1, D1 being equal to $(1/4) \times L2$; and along the lateral scanning direction, the second boundary (e.g., the left boundary) of sub-aperture 324 may be apart from the second boundary (e.g., the left boundary) of aperture 323 by a distance D2, D2 being equal to $(1/4) \times L1$. The third (e.g., lower) and fourth (e.g., right) boundaries of sub-aperture 324 may be aligned with those of aperture 323. A length of sub-aperture 324 in the lateral scanning direction may be L3, which is equal to $(3/4) \times L1$, and a length of sub-aperture 324 in the vertical scanning direction may be L4, which is equal to $(3/4) \times L2$. That is, the size/area of sub-aperture 324 may be equal to $(3/4) \times (3/4) \times L1 \times L2$.

Assuming no object 212 is detected in the functional distance range at any scanning points of the second scanning pattern in sub-aperture 324. For scanning the third scanning pattern, sub-aperture determining unit 238 may determine a second sub-aperture 326 positioned in sub-aperture 324 (and aperture 323) and may have a smaller size/area than sub-aperture 324. Scanning point 314 represents the first scanning point of the third scanning pattern in second sub-aperture 326. In some embodiments, second sub-aperture 326 is determined by skipping one or more rows and/or columns of scanning points, of the third scanning pattern, along the scanning directions in sub-aperture 324 (and aperture 323). In some embodiments, along the vertical scanning direction, the first boundary (e.g., the upper boundary) of second sub-aperture 326 may be apart from the first boundary of aperture 323 by a distance D3, D3 being equal to ($\frac{1}{2}$)L2; and along the lateral scanning direction, the second boundary (e.g., the left boundary) of second sub-aperture 326 may be apart from the second boundary of aperture 323 by a distance D4, D4 being equal to ($\frac{1}{2}$)L1. The third (e.g., lower) and fourth (e.g., right) boundaries of second sub-aperture 326 may be aligned with those of aperture 323. A length of second sub-aperture 326 in the lateral scanning direction may be L5, which is equal to ($\frac{1}{2}$)×L1, and a length of second sub-aperture 326 in the vertical scanning direction may be L6, which is equal to ($\frac{1}{2}$)×L2. That is, the size/area of second sub-aperture 326 may be equal to ($\frac{1}{2}$)×($\frac{1}{2}$)×L1×L2.

Assuming no object 212 is detected in the functional distance range in any scanning points of the third scanning pattern in second sub-aperture 326. For scanning the fourth scanning pattern, sub-aperture determining unit 238 may determine a third sub-aperture 328 positioned in second sub-aperture 326 (and aperture 323) and may have a smaller size/area than second sub-aperture 326. Scanning point 316 represents the first scanning point of the fourth scanning pattern in third sub-aperture 328. In some embodiments, third sub-aperture 328 is determined by skipping one or more rows and/or columns of scanning points, of the fourth scanning pattern, along the scanning directions in second sub-aperture 326 (and aperture 323). In some embodiments, along the vertical scanning direction, the first boundary (e.g., the upper boundary) of third sub-aperture 328 may be apart from the first boundary of aperture 323 by a distance D5, D5 being equal to ($\frac{3}{4}$)×L2; and along the lateral scanning direction, the second boundary (e.g., the left boundary) of second sub-aperture 326 may be apart from the second boundary of aperture 323 by a distance D6, D6 being equal to ($\frac{3}{4}$)×L1. The third (e.g., lower) and fourth (e.g., right) boundaries of third sub-aperture 328 may be aligned with those of aperture 323. A length of third sub-aperture 328 in the lateral scanning direction may be L7, which is equal to ($\frac{1}{4}$)×L1, and a length of third sub-aperture 328 in the vertical scanning direction may be L8, which is equal to ($\frac{1}{4}$)×L2. That is, the size/area of third sub-aperture 328 may be equal to ($\frac{1}{4}$)×($\frac{1}{4}$)×L1×L2.

Sub-aperture determining unit 238 may continue to determine a respective sub-aperture for the scanning of each subsequent scanning pattern in aperture 323 until all patterns are scanned or object 212 is detected in the functional distance range. If object 212 is detected in the functional distance range at any scanning point in any scanning pattern (e.g., similar to scanning point 310), transmitter scan control unit 236 may switch back to emission scheme 321 at the scanning point, and sub-aperture determining unit 238 may determine a sub-aperture (e.g., similar to sub-aperture 324) based on the most-recently determined aperture (e.g., similar to aperture 323) for the scanning of the next scanning pattern. Assuming a scanning pattern, corresponding to a sub-aperture, is $N^{th}$ from the scanning pattern in which a most-recent aperture is determined, a dimension of the sub-aperture along a scanning direction may be equal to ($1-\frac{1}{4}N$)L, L being the dimension of the aperture in the same scanning direction and N being equal to one of 1, 2, and 3. The area/size of the sub-aperture can be calculated as $$(1-\frac{1}{4}N)\times(1-\frac{1}{4}N)\times S,$$

S being the size/area of the most-recently determined aperture. In some embodiments, if FOV 300 is covered by M scanning patterns, M being a positive integer greater than 2, a dimension of the sub-aperture along a scanning direction may be equal to $$(1-\frac{N}{M})\times L,$$

N being a positive integer less than M. The area/size of the sub-aperture can be calculated as $$(1-\frac{N}{M})\times(1-\frac{N}{M})\times S.$$

Units 232-238 (and any corresponding sub-modules or sub-units) and module 250 can be hardware units (e.g., portions of an integrated circuit) of processor 230 designed for operation independently or with other components or software units implemented by processor 230 through executing at least part of a program. The program may be stored on a computer-readable medium. When the program is executed by processor 230, the executed program may cause processor 230 to perform one or more functions or operations. Although FIG. 2B shows units 232-238 all within one processor 230, it is contemplated that these units may be distributed among multiple processors located close to or remotely with each other. The functions of units 232-238 and module 250 are described in greater detail as follows in connection with FIGS. 4A-4G.

Memory 240 and storage 242 may include any appropriate type of mass storage provided to store any type of information that processor 230 may need to operate. Memory 240 and/or storage 242 may be volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, a static RAM, a hard disk, an SSD, an optical disk, etc. Memory 240 and/or storage 242 may be configured to store one or more computer programs that may be executed by processor 230 to perform functions disclosed herein. For example, memory 240 and/or storage 242 may be configured to store program(s) that may be executed by processor 230 to analyze LiDAR signals and control the scanning schemes of laser beams.

Memory 240 and/or storage 242 may be further configured to store/cache information and data received and/or used by processor 230. For instance, memory 240 and/or storage 242 may be configured to store/cache receiver signal 218, data of laser beam 209, and the corresponding tolerance values indicating the safety limits, and calculation results obtained by different units of processor 230. The various types of data may be stored permanently, removed periodically, or disregarded immediately after each frame of data is processed.

FIGS. 4A-4G each illustrates an exemplary FOV 300 of LiDAR system 102, according to embodiments of the present disclosure. Specifically, FIGS. 4A, 4B, 4D, and 4F each illustrates a scenario when object 212 is detected in the functional distance range, and FIGS. 4C, 4E, and 4G each illustrates a scenario when no object 212 is detected in the functional distance range. In some embodiments, FOV 300 is covered by scanning points of four scanning patterns interleavingly distributed in the vertical scanning direction. For ease of illustration, the scanning points to be scanned, being scanned, or scanned are depicted in solid circles, and the scanning points to be skipped or skipped are depicted in dashed circles. In the embodiments illustrated in FIGS. 4A-4G, the frame rate of LiDAR system 102 is assumed to be 10 fps.

Figure 4A:
FIGS. 4A-4G each illustrates an exemplary scenario of controlling laser emission in a LiDAR system, according to embodiments of the disclosure.
Figure 4A:
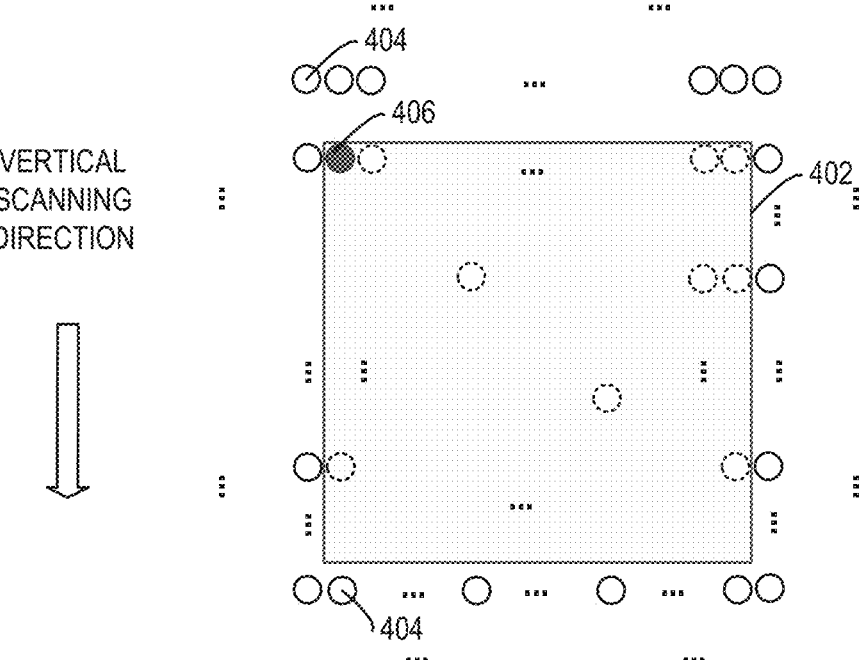
Figure 4A:
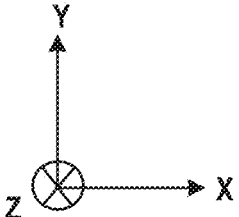

As shown in FIG. 4A, transmitter scan control unit 236 may control transmitter 202 to start scanning laser beam 209 according to a first emission scheme, following a first scanning pattern along the lateral scanning direction and the vertical scanning direction. The first emission scheme may be an example of emission scheme 320. Transmitter scan control unit 236 may also control the energy of laser beam 209, emitted by transmitter 202, to be under a respective safety limit, e.g., $AEL_{Class1}$. Scanning points 404 represent those at which laser beam 209 is scanned according to the first emission scheme. In some embodiments, scanning points 404 may be an example of scanning points 306-1.

In some embodiments, at a scanning point 406, object 212 is detected to be in the functional distance range based on returned laser beam 211. In some embodiments, scanning point 406 is located at $i^{th}$ row and $i^{th}$ column of the first scanning pattern, i and j each being a non-negative integer. Scanning point 406 may be an example of scanning point 310. Object detecting unit 260 may send an alert signal to transmitter adjusting module 250 indicating the detection result. In response to the alert signal, transmitter scan control unit 236 may switch from the first emission scheme to a second emission scheme along the lateral scanning direction and the vertical scanning direction. The second emission scheme may be an example of emission scheme 321.

In some embodiments, to start the second emission scheme, transmitter scan control unit 236 controls transmitter 202 to skip the rest of scanning points, of the first scanning pattern, towards an aperture 402 that extends from scanning point 406. In some embodiments, aperture 402 is an example of aperture 323. In an example, transmitter 202 scans laser beam 209 at a column of scanning points along the vertical scanning direction before moving along the lateral scanning direction to the next column. As shown in FIG. 4A, transmitter scan control unit 236 may control transmitter 202 to skip the rest of scanning points in aperture 402 in the vertical scanning direction and start scanning laser beam 209 at the first scanning point outside aperture 402 (e.g., scanning point 404 below aperture 402), according to the first emission scheme. Transmitter scan control unit 236 may continue the first emission scheme for scanning the next column of scanning points, e.g., 404, until switching to the second emission scheme for scanning laser beam 209 towards aperture 402. That is, transmitter 202 may skip all scanning points in the next column in aperture 402 and start scanning laser beam 209 continuously (e.g., with no skipped scanning points) in the same column outside aperture 402. Transmitter scan control unit 236 may control transmitter 202 to continue skipping scanning points of the first scanning pattern in aperture 402 until the scanning of the first scanning pattern is completed.

Transmitter scan control unit 236 may then start the scanning of the second scanning pattern along the lateral and vertical scanning directions. In some embodiments, transmitter 202 scans the second scanning pattern along the same scanning directions (e.g., from left to right and top to bottom) in FOV 300.

Figure 4B:
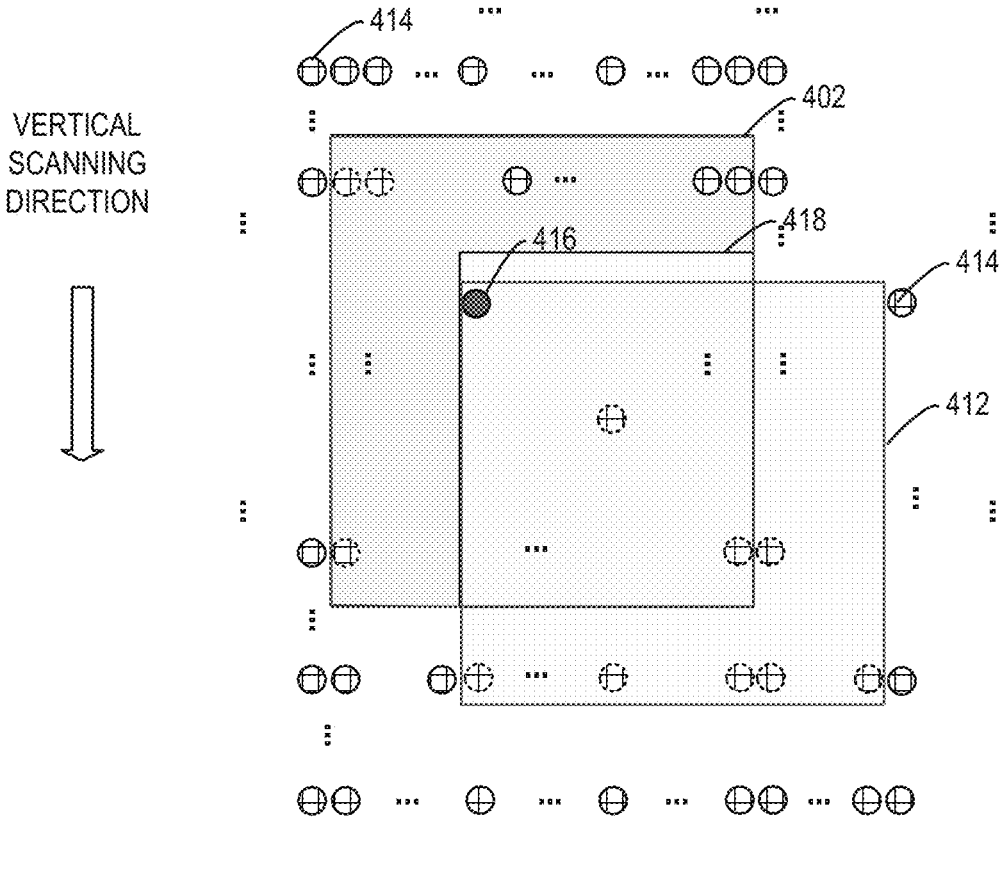

FIG. 4B illustrates a scenario in which object 212 is detected in the functional distance range at a scanning point of the second scanning pattern. Transmitter scan control unit

236 may control transmitter 202 to start scanning laser beam 209 at scanning points of the second scanning pattern in FOV 300. Scanning points 414 may represent the scanning points according to the first emission scheme and may be an example of scanning points 306-2. Transmitter scan control unit 236 may skip one or more rows and/or columns in aperture 402 along the lateral and vertical scanning directions, and start scanning laser beam 209 at the first scanning point of the second scanning pattern in a sub-aperture 418 of aperture 402. Sub-aperture 418 may be determined by sub-aperture determining unit 238. In some embodiments, a dimension of sub-aperture 418 in the lateral scanning dimension is ¾ of that of aperture 402, and a dimension of sub-aperture 418 in the vertical scanning dimension is ¾ of that of aperture 402. Object detecting unit 260 may determine whether object 212 is detected in the functional distance range at each scanning point in sub-aperture 418. If no object 212 is detected in the functional distance range at a scanning point 416 in sub-aperture 418, transmitter scan control unit 236 may apply the first emission scheme on transmitter 202 for the scanning of the next scanning point in sub-aperture 418. If object 212 is detected in the functional distance range at a scanning point 416, transmitter scan control unit 236 may apply a second emission scheme on transmitter 202. In some embodiments, the second emission scheme is an example of emission scheme 321. In some embodiments, scanning point 416 where object 212 is detected in the functional distance range, is located at $(i+m)^{th}$ row and $(j+n)^{th}$ column of the second scanning pattern, m and n each being a positive integer. When second emission scheme is applied, emission scheme determining unit 234 may determine a new aperture extending from the current scanning point, at which object 212 is detected in the functional distance, and skip the rest of all the scanning points of the current scanning pattern in the new aperture. The new aperture, e.g., aperture 412, is an example of aperture 323.

As shown in FIG. 4B, object 212 may be detected in the functional distance range at scanning point 416 of the second scanning pattern in sub-aperture 418. For ease of illustration, scanning point 416 is depicted as the first scanning point of the second scanning pattern in sub-aperture 418. The first scanning point of the second scanning pattern may be an example of scanning point 310. An aperture 412, extending from scanning point 416 (e.g., the current scanning point) may be determined. Transmitter scan control unit 236 may skip the rest of all the scanning points of the second scanning pattern in aperture 412 (according to the second emission scheme) and scan continuously outside aperture 412 (according to the first emission scheme) along the lateral and vertical scanning directions.

Figure 4C:
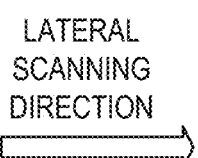
Figure 4C:
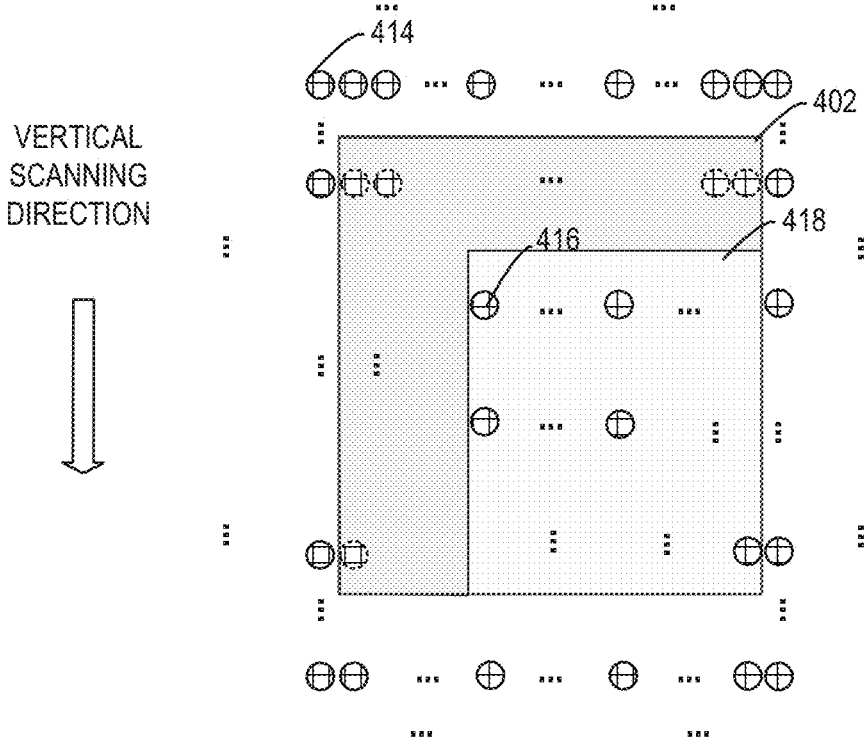
Figure 4C:
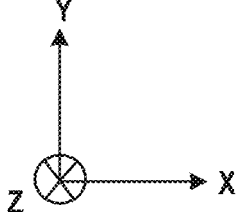

FIG. 4C illustrates a scenario in which no object 212 is detected in the functional distance range at any scanning point of the second scanning pattern in sub-aperture 418. Transmitter scan control unit 236 may control transmitter 202 to skip one or more rows and/or columns of scanning points of the second scanning pattern in aperture 402 along the scanning directions, and scan laser beam 209 from the first scanning point (e.g., scanning point 416) of the second scanning pattern in sub-aperture 418. If no object 212 is detected in the functional distance range at scanning point 416 in sub-aperture 418, transmitter scan control unit 236 may apply the first emission scheme for scanning the next (e.g., immediately-subsequent) scanning point in sub-aperture 418. In some embodiments, transmitter 202 continues to scan laser beam 209 according to the first emission scheme at scanning points in sub-aperture 418 until the scanning of all the scanning points 416 is completed. In some embodiments, transmitter scan control unit 236 switches to the second emission scheme and controls transmitter 202 to scan laser beam 209 accordingly when object 212 is detected in the functional distance range at one of scanning points 416, similar to the scenario illustrated in FIG. 4B. Meanwhile, transmitter scan control unit 236 may control transmitter 202 to scan laser beam 209 continuously, according to the first emission scheme, outside aperture 402.

Figure 4D:
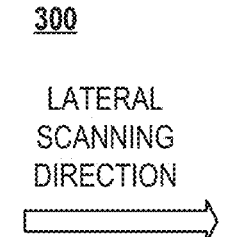

After the scanning of the second scanning pattern is completed, transmitter scan control unit 236 may start scanning the third scanning pattern in FOV 300. As an example, it is assumed that no object 212 is detected in the functional distance range at any scanning points 416 of the second scanning pattern. Transmitter scan control unit 236 may control transmitter 202 to scan laser beam 209 continuously according to the first emission scheme outside aperture 402, skip one or more rows and/or columns of the scanning points in aperture 402, and start scanning from the first scanning point of the third scanning pattern in a second sub-aperture in aperture 402. FIG. 4D illustrates a scenario in which object 212 is detected in the functional distance range at one of the scanning points in a second sub-aperture 428 in aperture 402. Second sub-aperture 428 may be an example of second sub-aperture 326. Scanning points 424 represent the scanning points of the third scanning pattern according to the first emission scheme, and scanning points 426 represents the scanning points of the third scanning pattern in second sub-aperture 428. Scanning points 424 may be an example of scanning points 306-3. In some embodiments, a dimension of sub-aperture 428 in the lateral scanning dimension is ½ of that of aperture 402, and a dimension of sub-aperture 428 in the vertical scanning dimension is ½ of that of aperture 402.

As an example, object 212 is detected at the first scanning point, e.g., 426, of the third scanning pattern in second sub-aperture 428. The first scanning point of the third scanning pattern may be an example of scanning point 310. Transmitter scan control unit 236 may determine a second aperture 430 extending from the current scanning point, e.g., the first scanning point of the third scanning pattern in second sub-aperture 428, and extending in the scanning directions. Second aperture 430 may be an example of aperture 323. Transmitter scan control unit 236 may adjust to the second emission scheme for the scanning points in second aperture 430, e.g., skipping the rest of all the scanning points in second aperture 430. In some embodiments, transmitter scan control unit 236 controls transmitter 202 to scan laser beam 209 continuously, according to the first emission scheme, towards scanning points outside second aperture 430. For example, as shown in FIG. 4D, transmitter 202 may scan laser beam 209 towards scanning points 424, outside second aperture 430, in the same column as the current scanning point and in subsequent (e.g., next) column of the current scanning point, according to the first emission scheme. In some embodiments, if object 212 is detected at any scanning point 426 in the functional distance range in sub-aperture 428 and the scanning point 426 is located at $k^{th}$ row and $l^{th}$ column of the second scanning pattern, the scanning point (e.g., 426) at which object 212 is detected in the functional distance range in second sub-aperture 428 is located at $(k+p)^{th}$ row and $(l+q)^{th}$ column, k, l, p, and q each being a positive integer.

Figure 4E:
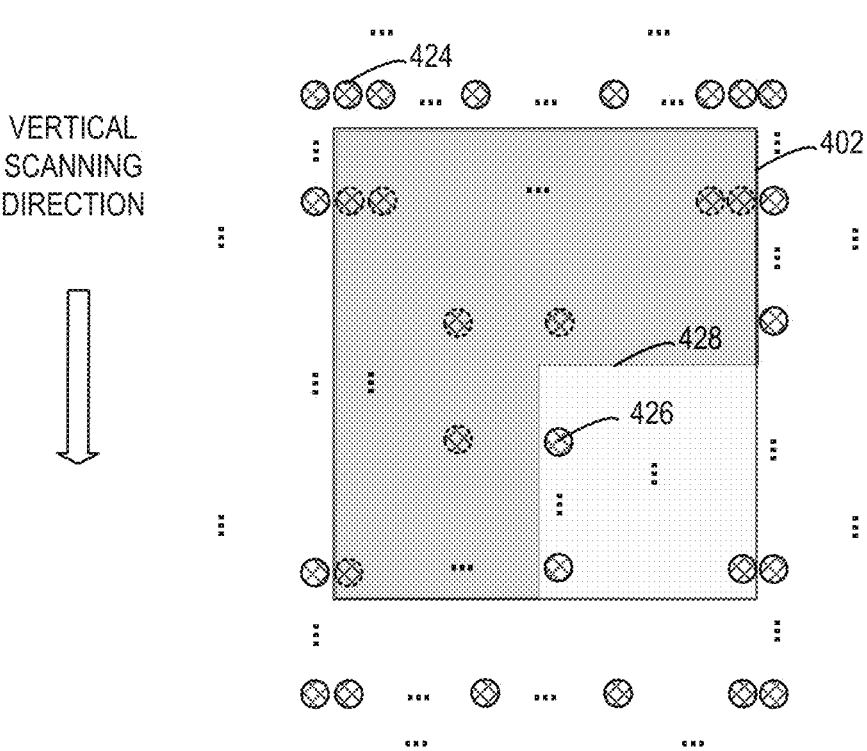

FIG. 4E illustrates a scenario in which no object 212 is detected in the functional distance range at any of the scanning points in second sub-aperture 428 in aperture 402. Different from the scenario illustrated in FIG. 4D, when no object 212 is detected at one scanning point 426 in second sub-aperture 428, transmitter scan control unit 236 controls transmitter 202 to scan laser beam 209 towards the next scanning point 426 in second sub-aperture 428 according to the first emission scheme. When no object 212 is detected in the functional distance range at any scanning points 426 in second sub-aperture 428, transmitter 202 may scan each scanning points 426 according to the first emission scheme. Meanwhile, transmitter 202 may scan laser beam 209 towards scanning points 424 according to the first emission scheme outside aperture 402.

Figure 4F:
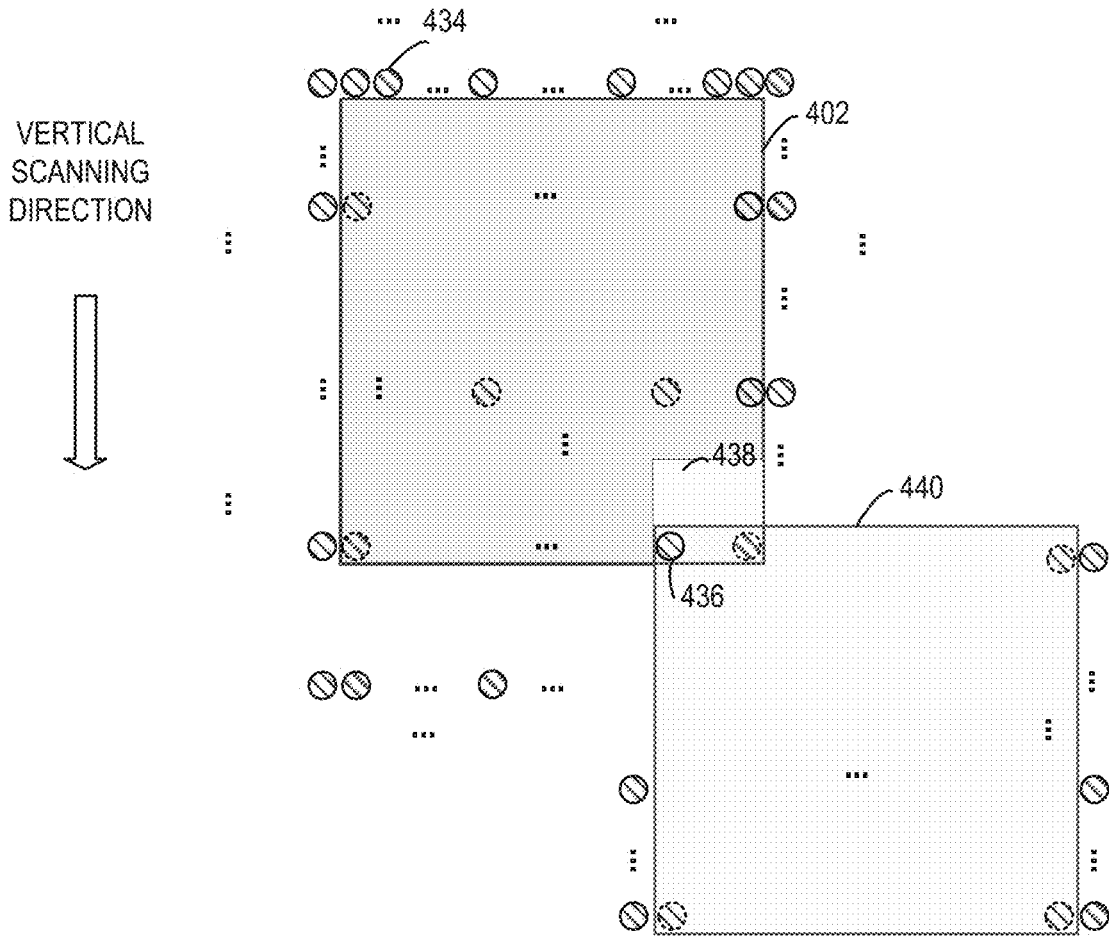

After the scanning of the third scanning pattern is completed, transmitter scan control unit 236 may start scanning the four scanning pattern in FOV 300. As an example, assuming no object 212 is detected in the functional distance range at one of scanning points 426 of the third scanning pattern, transmitter scan control unit 236 may control transmitter 202 to scan laser beam 209 according to the fourth scanning pattern. Transmitter 202 may scan laser beam 209 continuously according to the first emission scheme outside aperture 402, skip one or more rows and/or columns of the scanning points in aperture 402, and start scanning from the first scanning point of the fourth scanning pattern in a third sub-aperture in aperture 402. FIG. 4F illustrates a scenario in which object 212 is detected in the functional distance range at one of the scanning points in a third sub-aperture 438 in aperture 402. Third sub-aperture 438 may be an example of third sub-aperture 328. Scanning points 434 represent the scanning points of the fourth scanning pattern according to the first emission scheme, and scanning points 436 represent the scanning points of the fourth scanning pattern in third sub-aperture 438. Scanning points 434 may be an example of scanning points 306-4. In some embodiments, a dimension of third sub-aperture 438 in the lateral scanning dimension is ¼ of that of aperture 402, and a dimension of third sub-aperture 438 in the vertical scanning dimension is ¼ of that of aperture 402.

As an example, object 212 is detected in the functional distance range at the first scanning point, e.g., 436, of the fourth scanning pattern in third sub-aperture 438. The first scanning point of the fourth scanning pattern in third sub-aperture 438 may be an example of scanning point 310. Transmitter scan control unit 236 may determine a third aperture 440 extending from the current scanning point, e.g., the first scanning point of the fourth scanning pattern in third sub-aperture 438, and extending in the scanning directions. Third aperture 440 may be an example of aperture 323. Transmitter scan control unit 236 may apply the second emission scheme for the scanning points in third aperture 440, e.g., skipping the rest of all scanning points in third aperture 440. In some embodiments, transmitter scan control unit 236 controls transmitter 202 to scan laser beam 209 continuously, according to the first emission scheme, towards scanning points outside third aperture 440. For example, as shown in FIG. 4F, transmitter 202 may scan laser beam 209 towards scanning points 434, outside third aperture 440, in the same column as the current scanning point and in subsequent (e.g., next) column of the current scanning point, according to the first emission scheme.

Figure 4G:
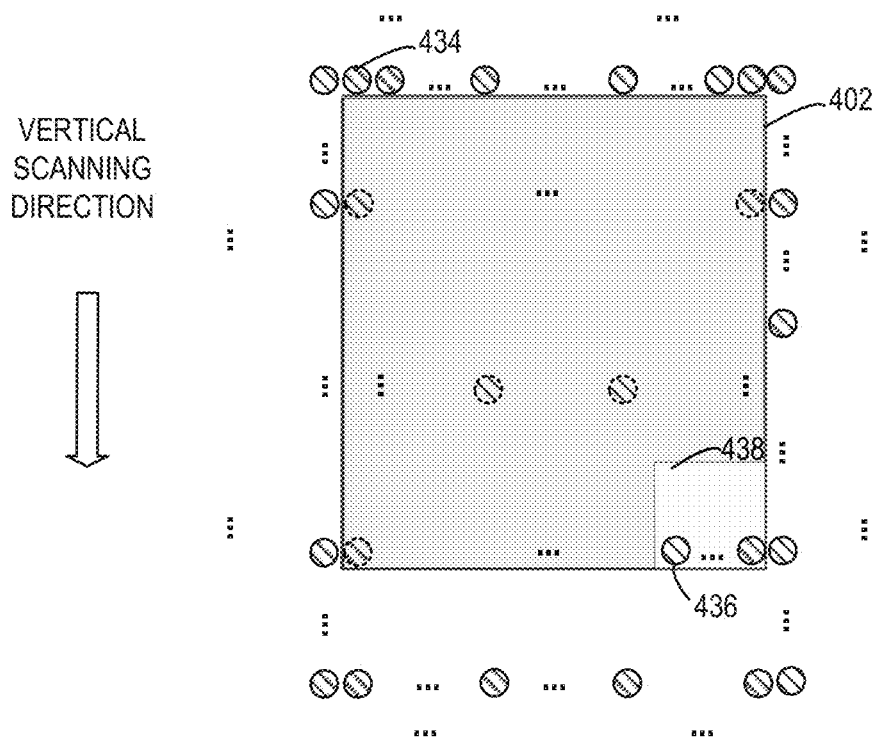

FIG. 4G illustrates a scenario in which no object 212 is detected in the functional distance range at any of the scanning points in third sub-aperture 438 in aperture 402. Different from the scenario illustrated in FIG. 4F, when no object 212 is detected in the functional distance range at one scanning point 436 in third sub-aperture 438, transmitter scan control unit 236 controls transmitter 202 to scan laser beam 209 towards the next scanning point 436 in third sub-aperture 438 according to the first emission scheme. When no object 212 is detected in the functional distance range at any scanning points 436 in third sub-aperture 438, transmitter 202 may scan each scanning points 436 according to the first emission scheme. Meanwhile, transmitter 202 may scan laser beam 209 towards scanning points 434 according to the first emission scheme outside aperture 402.

In some embodiments, if object 212 is not detected in the functional distance range in any scanning points (e.g., 404, 414, 424, and 434), transmitter scan control unit 236 may control transmitter 202 to scan laser beam 209 continuously, e.g., according to the first emission scheme, in FOV 300, as shown in FIG. 3C, or until object 212 is detected in the functional distance range.

As shown in FIGS. 4A-4G, regardless of the detection results of subsequent scanning patterns, when object 212 is detected in the functional distance range in the first scanning pattern, transmitter scan control unit 236 may control transmitter 202 to scan the next pattern in the aperture from the same first scanning point of the next scanning pattern. That is, the scanning of the next pattern, in the most-recently determined aperture, starts from the first scanning point of the next pattern in the respective sub-aperture for all subsequent scanning patterns. Thus, if object 212 is repeatedly detected in the functional distance range from the first time it was detected, the total number of scanning points in the aperture is equal to four, in one frame. By reducing the number of scanning points in the FOV, the total energy of laser beams is limited, and human eye is thus less susceptible to harm by LiDAR system 102.

It should be noted that, the location of an aperture can be arbitrary and is determined based on the location of object 212, and should not be limited by the embodiments of the present disclosure. For illustrative purposes, in FIGS. 4A-4G, apertures are depicted to extend from scanning points each below the first scanning point of a column. However, in various embodiments, if object 212 is detected at the functional distance range at the first scanning point of a column, transmitter scan control unit 236 may apply the second emission scheme from the first scanning point (e.g., the current scanning point), and control transmitter 202 to skip the rest of all the scanning points in an aperture extending from the first scanning point.

It should also be noted that, the shape and the extending directions of the aperture, should be determined based on the scanning directions of LiDAR system 102, and should not be limited by the embodiments of the present disclosure. According to the second emission scheme, the current scanning point, e.g., the scanning point at which object 212 is detected in the functional distance range, should be the first and only scanning point in the aperture. The aperture should include/cover the current scanning point and extend along the scanning directions. The shape of the aperture may be chosen to minimize the number of skipped scanning points.

It should also be noted that, the number of skipped scanning points in the aperture should be determined based on the design of LiDAR system 102 and should not be limited by the embodiments of the present disclosure. The number of skipped scanning points in an aperture may be determined, partially or fully, based on the predetermined safety limit, which is a value to ensure no potential harm can be caused to human eye even if the human eye is located at the same location of object 212. The predetermined safety limit is, partially or fully, determined based on the frame rate of LiDAR system 102. For example, a different frame rate can result in a different predetermined safety limit. The predetermined safety limit can also be determined using any suitable way and have other suitable values. In other embodiments, if an aperture covers more than one scanning points, the distribution of the scanning points may optimize the spatial resolution and/or detectability of object 212 in the aperture.

Figure 5A:
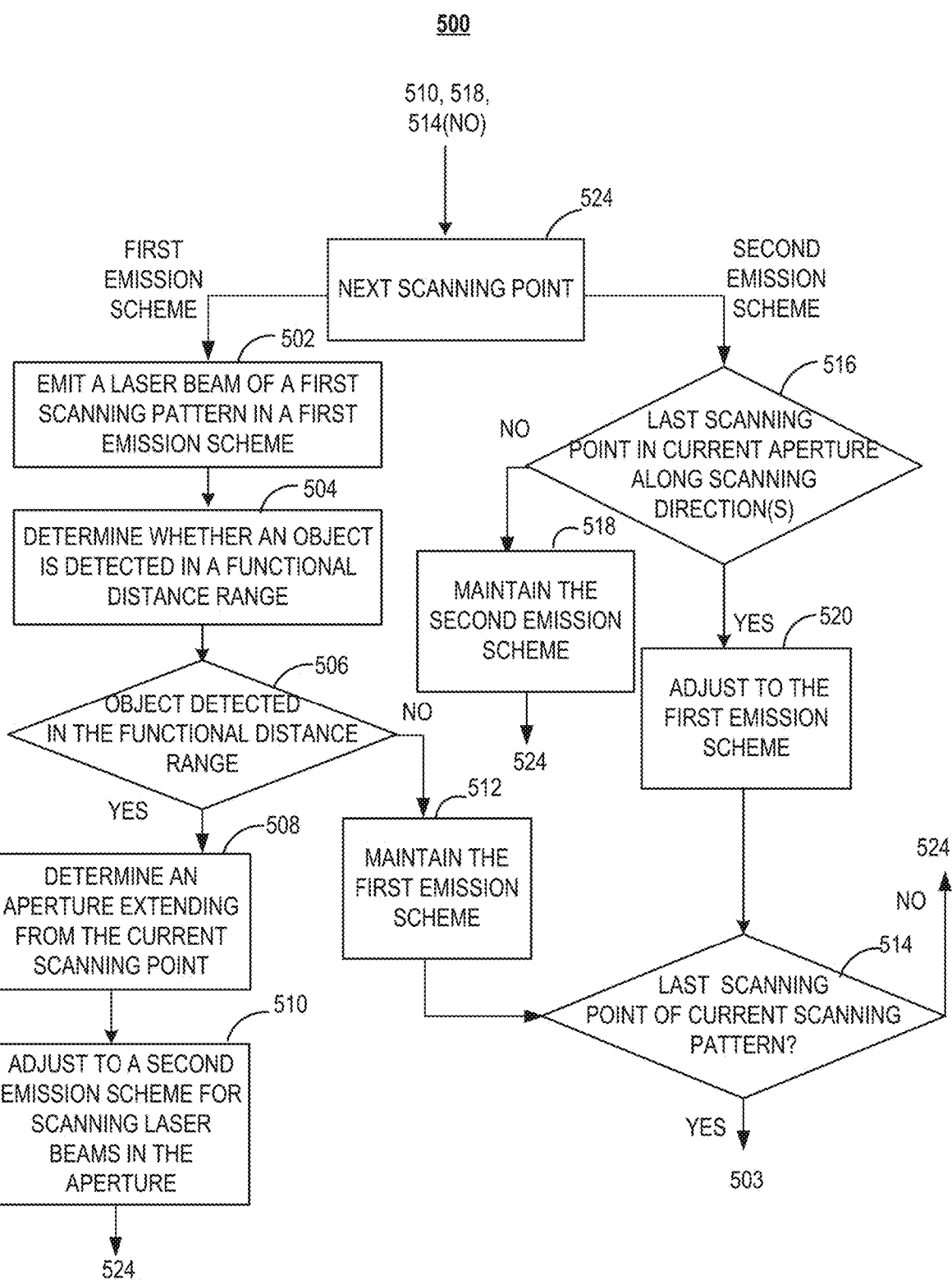
FIG. 5A illustrates a flowchart of an exemplary method to control laser emission of a scanning pattern in a LiDAR system, according to embodiments of the disclosure.
Figure 5B:
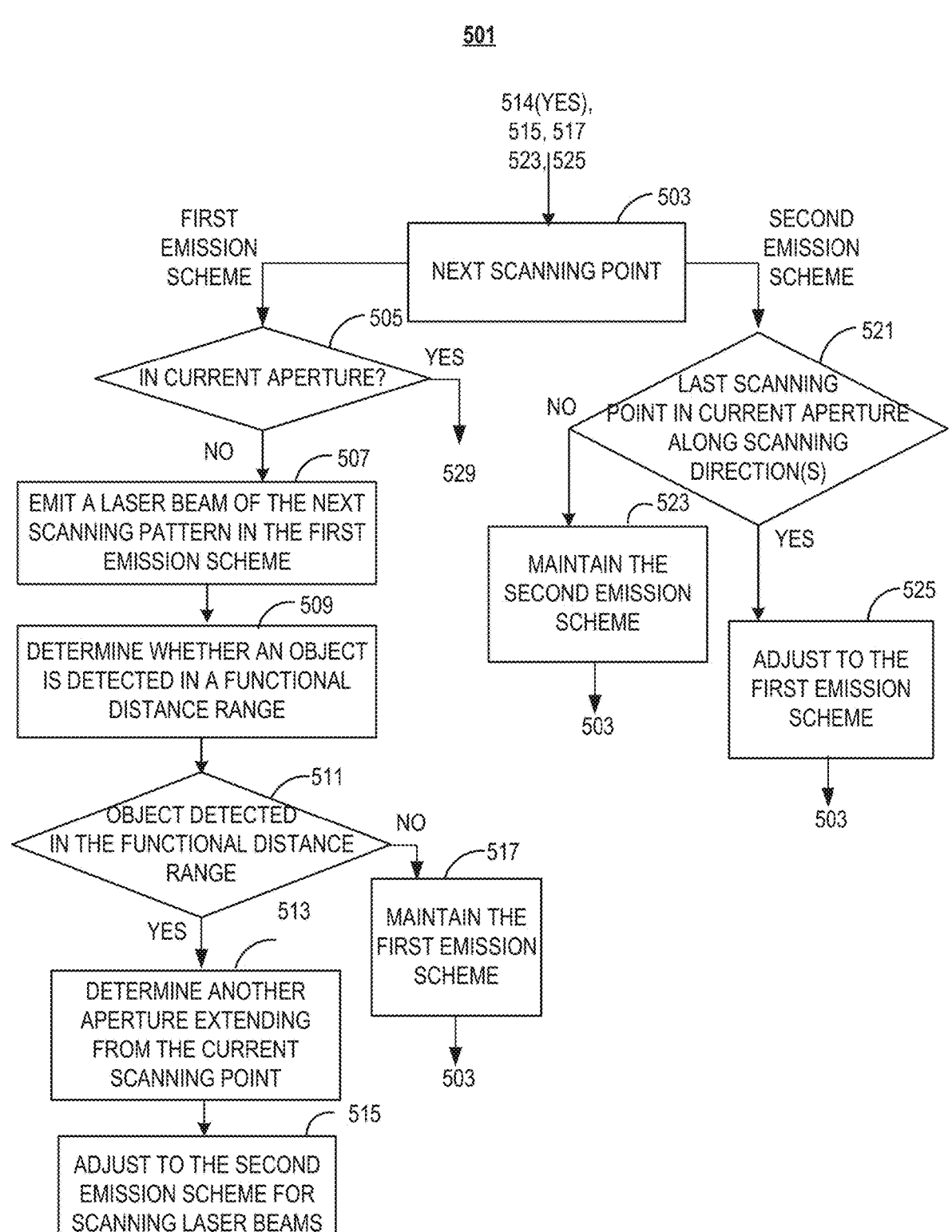
FIGS. 5B and 5C illustrate a flowchart of an exemplary method to control laser emission of another scanning pattern in a LiDAR system, according to embodiments of the disclosure.
Figure 5C:
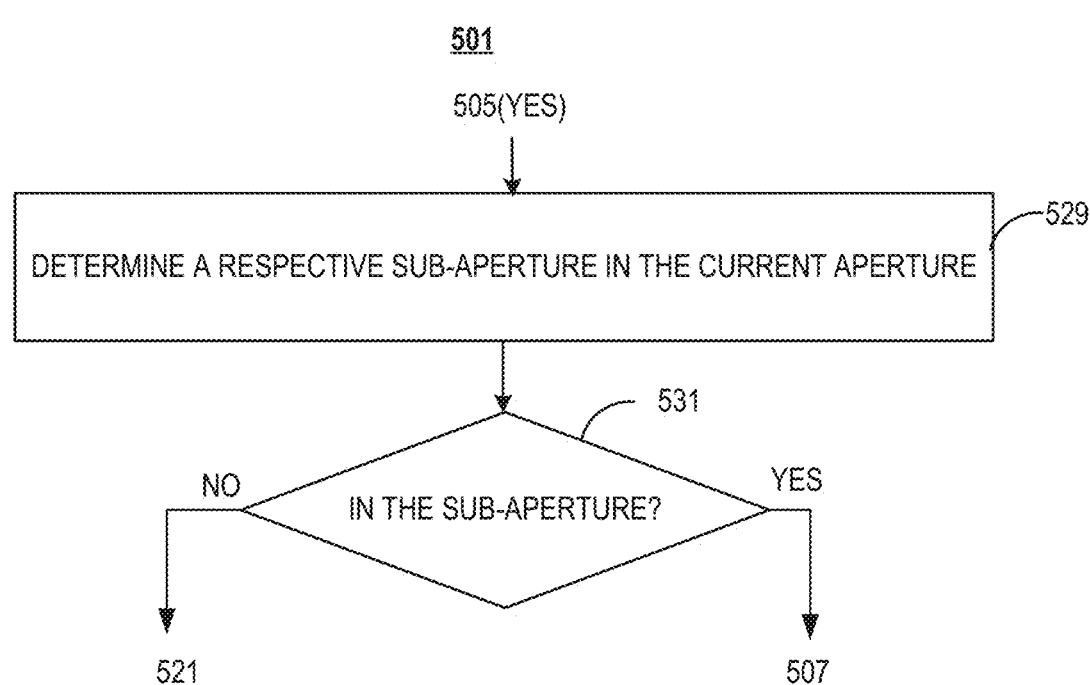

FIG. 5A illustrates a flow chart of an exemplary method 500 for controlling the emission scheme of laser beam 209 to limit its pulse energy to be incident on an aperture in one scanning pattern, according to some embodiments. FIGS. 5B and 5C illustrate a flow chart of an exemplary method 501 for controlling the emission scheme of laser beam 209 to limit its pulse energy to be incident on an aperture in another scanning pattern, according to some embodiments. FIG. 5C is a continuation of FIG. 5B and therefore FIGS. 5B and 5C are described together. For ease of illustration, methods 500 and 501 are described along with FIGS. 3A-3E and 4A-4G.

FIG. 5A illustrates method 500 for controlling the emission scheme of laser 209 in one scanning pattern, e.g., the first scanning pattern in FIGS. 3C and 3E and the related description, according to some embodiments. As shown in FIG. 5A, at step 502, a laser beam of a first scanning pattern is emitted according to a first emission scheme, and the energy, e.g., pulse energy, of the laser beam is controlled under a safety limit. Controller 252 may control transmitter 202 to emit laser beam 209 of a first scanning pattern (e.g., FIG. 4A and the description) according to the first emission scheme (e.g., 320), which is a high-resolution emission scheme, towards FOV 300. Controller 252 may control the energy of laser beam 209 to be below a predetermined safety limit. The laser beam is emitted towards a surrounding environment and reflected by one or more objects in the environment. The reflected laser beam returns to the optical sensing system.

At step 504, it is determined whether an object is detected in the functional distance range based on a returned laser beam. Controller 252 may determine whether object 212 is detected in the functional distance range based on receiver signal 218. Controller 252 may determine whether object 212 is detected in the functional distance range based on a comparison between the distance from object 212 to receiver 204 and distance tolerance value D0. At step 506, whether object 212 is detected in the functional distance range at the current scanning point is determined. If the distance from object 212 to receiver 204 is less than distance tolerance value D0, object 212 is determined to be in the functional distance range at the current scanning point, and method 500 proceeds to step 508. If no object is detected within distance tolerance value D0, method 500 proceeds to step 510.

At step 508, an aperture is determined extending from the current scanning point along scanning directions. Controller 252 may determine an aperture extending from the current scanning point (e.g., aperture 323 or 402) and extending in the lateral and vertical scanning directions. The size of the aperture can cover the area of a human pupil. In some embodiments, the aperture has a square shape. At step 510, the emission scheme of transmitter 202 is switched to a second emission scheme for scanning laser beams (e.g., at the next scanning point) in the aperture. Controller 252 may switch the emission scheme to a second emission scheme (e.g., emission scheme 321), which is a low-resolution emission scheme, to scan laser beam 209 towards the aperture. In some embodiments, the second emission scheme defines a scanning pattern that includes only the current scanning point (e.g., already scanned) and skips the rest of all unscanned scanning points in the aperture.

After step 510, method 500 proceeds to step 524, where the laser beam is moved towards the next scanning point. Controller 252 may control transmitter to move laser beam 209 to the desired orientation and maintain the second emission scheme. In some embodiments, controller 252 may determine the orientation of laser beam 209 based on the coordinates of the current scanning point. After step 524, based on whether the next scanning of laser beam 209 is scanned according to the first emission scheme or the second emission scheme, method 500 is directed to step 502 (for first emission scheme) or step 516 (for second emission scheme).

At step 512, the first emission scheme is maintained. Controller 252 may maintain first emission scheme if no object is detected in the functional distance range. At step 514 it is determined whether the current scanning point is the last scanning point of the first scanning pattern. Controller 252 may determine whether the current scanning point is the last scanning point in the frame of the current scanning pattern, e.g., based on the coordinates of the current scanning point and/or the number of previously scanned scanning points in the current frame. If the current scanning point is determined to be the last scanning point of the current scanning pattern, method 500 is directed to step 503 of FIG. 5B, the laser beam is moved towards the first scanning point of the next scanning pattern, which will be described later. Otherwise, the operation is directed to step 524.

At step 516, controller 252 may determine whether the current scanning point is the last scanning point in the current aperture along the scanning direction(s), e.g., the vertical scanning direction. In some embodiments, the current scanning point is a skipped (e.g., unscanned) scanning point, at which no laser beam 209 is emitted. Controller 252 may determine the position of the current scanning point and determine whether it is located at the boundary of the current aperture such that the next scanning point is the first scanning point outside the current aperture (e.g., along the vertical scanning direction).

If it is determined the current scanning point is the last scanning point (e.g., a skipped scanning point) in the current aperture, method 500 proceeds to step 520. Otherwise, method 500 proceeds to step 518. At step 518, the second emission scheme is maintained. From step 518, method 500 may proceed to step 524, where the laser beam is moved towards the next scanning point 4. At step 520, the emission scheme is adjusted to the first emission scheme. Controller 252 may control transmitter 202 to adjust the emission scheme to the first emission scheme. From step 520, method 500 proceeds to step 514, which is described above.

FIGS. 5B and 5C illustrate method 501 for controlling the emission scheme of laser 209 in another scanning pattern subsequent to the scanning pattern in FIG. 5A, according to some embodiments. FIG. 5C is a continuation of FIG. 5B. The scanning pattern in FIGS. 5B and 5C can be any one of the second scanning pattern, the third scanning pattern, and the fourth scanning pattern, e.g., in FIGS. 3C and 3E and the related description. As shown in FIG. 5B, method 501 may start from step 503, in which laser beam 209 is emitted towards the first scanning point of the current scanning pattern. After step 503, based on whether the first emission scheme or the second emission scheme is to be employed, method 501 proceeds to step 505 (for first emission scheme) or step 521 (for second emission scheme).

At step 505, it is determined whether the current scanning point is in a current aperture. In some embodiments, the current aperture represents the aperture determined in a previous scanning pattern (e.g., the first scanning pattern).

Controller 252 may determine the relative position of the current scanning point versus the current aperture. If the current scanning point is determined to be in the current aperture, method 501 proceeds to step 529. Otherwise, method 501 proceeds to step 507. At step 507, a laser beam of the next scanning pattern is emitted according to the first emission scheme, and the energy, e.g., pulse energy, of the laser beam is controlled under a safety limit. In some embodiments, controller 252 controls transmitter 202 to emit laser beam 209 of the second scanning pattern (e.g., FIG. 4B and the description) according to the first emission scheme (e.g., 320), which is a high-resolution emission scheme, towards FOV 300. Controller 252 may control the energy of laser beam 209 to be below a predetermined safety limit. At step 509, it is determined whether an object is detected in the functional distance range. Step 509 may be similar to step 504, and the detailed description is not repeated herein. At step 511, if an object is detected in the functional distance range, method 501 proceeds to step 513. Otherwise, method 501 proceeds to step 517.

At step 513, another aperture is determined extending from the current scanning point along scanning directions. Controller 252 may determine the other aperture extending from the current scanning point (e.g., aperture 323) and extending in the lateral and vertical scanning directions. The size of the other aperture can cover the area of a human pupil. In some embodiments, the other aperture has a square shape. At step 515, the emission scheme of transmitter 202 is switched to the second emission scheme for scanning laser beams in the other aperture. Controller 252 may switch to the second emission scheme (e.g., emission scheme 321), which is a low-resolution emission scheme, to scan laser beam 209 towards the other aperture. After step 515, method 501 proceeds to step 503, where the laser beam is moved towards the next scanning point. Controller 252 may control transmitter to move laser beam 209 to the desired orientation and maintain the second emission scheme. In some embodiments, controller 252 may determine the orientation of laser beam 209 based on the coordinates of the current scanning point.

At step 517, the first emission scheme is maintained. Controller 252 may maintain first emission scheme if no object 212 is detected in the functional distance range. From step 517, method 501 also proceeds to step 503 to scan the next scanning point. To the extent the current scanning point is the last scanning point of the current scanning pattern, the "next scanning point" would be the first scanning point of the next scanning pattern.

At step 521, controller 252 may determine whether the current scanning point is the last scanning point in the current aperture along the scanning direction(s), e.g., the vertical scanning direction. In some embodiments, the current scanning point is a skipped (e.g., unscanned) scanning point, at which no laser beam 209 is to be emitted. Controller 252 may determine the position of the current scanning point and determine whether it is located at the boundary of the current aperture such that the next scanning point is the first scanning point outside the current aperture (e.g., along the vertical scanning direction).

If it is determined the current scanning point is the last scanning point in the current aperture along the scanning direction(s), method 501 proceeds to step 525. Otherwise, method 501 proceeds to step 523. At step 523, the second emission scheme is maintained. At step 525, the emission scheme is adjusted to the first emission scheme. From both step 523 and step 525, method 501 may proceed to step 503.

At step 529, a respective sub-aperture of the current aperture is determined. Controller 252 may determine the sub-aperture, at the current scanning pattern, before scanning laser beam 209 towards the current aperture, as shown in FIGS. 3E and 418 in FIGS. 4B and 4C, and the related description). At step 531, if the current scanning point is determined to be in the sub-aperture, method 501 proceeds to step 507. Otherwise, method 501 proceeds to step 521.

Although the descriptions above are made in the context of protecting human eyes and the exemplary embodiments refer to human pupil sizes, it is contemplated that the disclosed systems and methods can be readily adapted for the protection of eyes of other objects, such as animals (e.g., pets). Accordingly, the embodiments may be modified to use sizes of pupils of the respective objects attempted to protect.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A method for controlling an emission of laser beams using a plurality of scanning patterns by an optical sensing device, wherein the plurality of scanning patterns interleavingly cover a field of view of the optical sensing device, comprising:

detecting an object within a functional distance range from the optical sensing device based on a reflected first laser beam received by the optical sensing device, wherein the first laser beam is emitted towards a first scanning point in a first scanning pattern and the first scanning pattern includes a plurality of scanning points in addition to the first scanning point;

determining an aperture extending from the first scanning point in the first scanning pattern, wherein the aperture includes the plurality of scanning points of the first scanning pattern and a second scanning point in a second scanning pattern;

determining a sub-aperture within the aperture, wherein the sub-aperture includes the second scanning point and has a length that is smaller than a length of the aperture in a lateral scanning direction and a width that is smaller than a width of the aperture in the vertical scanning direction controlling the optical sensing device to emit a second laser beam towards the second scanning point in the second scanning pattern and skip the plurality of scanning points of the first scanning pattern between the first scanning point and the second scanning point in the aperture;

detecting whether the object is within the functional distance range from the optical sensing device based on a reflected second laser beam received by the optical sensing device; and controlling the optical sensing device to emit a third laser beam towards a third scanning point in the second scanning pattern in the sub-aperture when the controller detects that the object is not within the functional distance range from the optical sensing device based on the reflected second laser beam reflected by the optical sensing device.

2. The method of claim 1, wherein each of the first scanning pattern and the second scanning pattern comprises a plurality of scanning points arranged in a plurality of rows and a plurality of columns, wherein the plurality of scanning points skipped between the first scanning point and the second scanning point include a row of scanning points.

3. The method of claim 2, wherein the second scanning pattern immediately follows the first scanning pattern in an order of interleaving.

4. The method of claim 3, wherein the first scanning point is in the $i^{th}$ row and $j^{th}$ column of the first scanning pattern, wherein the second scanning point is in the $(i+1)^{th}$ row and $(j+1)^{th}$ column of the second scanning pattern.

5. The method of claim 1, comprising:

performing a two-dimensional scanning, the aperture extending from the first scanning point along both scanning directions; and a size of the aperture is sufficient to cover an area of a pupil of an object.

6. A system for controlling an emission of laser beams using a plurality of scanning patterns by an optical sensing device, wherein the plurality of scanning patterns interleavingly cover a field of view of the optical sensing device, the system comprising:

a controller, configured to:

detect an object within a functional distance range from the optical sensing device based on a reflected first laser beam received by the optical sensing device, wherein the first laser beam is emitted towards a first scanning point in a first scanning pattern, wherein the first scanning pattern includes a plurality of scanning points in addition to the first scanning point;

determine an aperture extending from the first scanning point in the first scanning pattern, wherein the aperture includes the plurality of scanning points of the first scanning pattern and a second scanning point in a second scanning pattern;

determine a sub-aperture within the aperture, wherein the sub-aperture includes the second scanning point and has a length that is smaller than a length of the aperture in a lateral scanning direction and a width that is smaller than a width of the aperture in the vertical scanning direction;

control the optical sensing device to emit a second laser beam towards the second scanning point in the second scanning pattern and skip the plurality of scanning points of the first scanning pattern between the first scanning point and the second scanning point in the aperture;

detect whether the object is within the functional distance range from the optical sensing device based on a reflected second laser beam received by the optical sensing device; and control the optical sensing device to emit a third laser beam towards a third scanning point in the second scanning pattern in the sub-aperture when the controller detects that the object is not within the functional distance range from the optical sensing device based on the reflected second laser beam reflected by the optical sensing device.

7. The system of claim 6, wherein each of the first scanning pattern and the second scanning pattern comprises a plurality of scanning points arranged in a plurality of rows and a plurality of columns, wherein the plurality of scanning points of the first scanning pattern skipped between the first scanning point and the second scanning point include a row of scanning points.

8. The system of claim 7, wherein the second scanning pattern immediately follows the first scanning pattern in an order of interleaving.

9. The system of claim 8, wherein the first scanning point is in the $i^{th}$ row and $j^{th}$ column of the first scanning pattern, wherein the second scanning point is in the $(i+m)^{th}$ row and $(j+n)^{th}$ column of the second scanning pattern, i and j each being a non-negative integer, m and n each being a positive integer.

10. The system of claim 6, wherein the optical sensing device performs a two-dimensional scanning, and the aperture extends from the first scanning point along both scanning directions.

11. The system of claim 10, wherein a size of the aperture is sufficient to cover an area of a pupil of an object.

12. The system of claim 6, wherein at a distance limit of the functional distance range, an area of the laser beam is equal to 2.5 times an area of the laser beam at the optical sensing device.

13. The system of claim 12, wherein the aperture is a square area having a length of 7 mm along the lateral scanning direction and a width of 7 mm along the vertical scanning direction.

14. The system of claim 6, wherein the controller is configured to control the optical sensing device to emit laser beams towards scanning points in the plurality of scanning patterns outside the aperture without skipping any scanning point.

15. The system of claim 6, wherein the controller is further configured to:

control the optical sensing device to emit a third laser beam towards a third scanning point in a third scanning pattern and skip the scanning points between the second scanning point and the third scanning point in the aperture when the controller detects that the object is within the functional distance range from the optical sensing device based on the reflected second laser beam reflected by the optical sensing device.

16. The system of claim 15, wherein the third scanning pattern immediately follows the second scanning pattern in an order of interleaving.

17. The system of claim 16, wherein the second scanning point is in the $k^{th}$ row and $i^{th}$ column of the second scanning pattern, wherein the third scanning point is in the $(k+p)^{th}$ row and $(1+q)^{th}$ column of the third scanning pattern, k, 1, p and q each being a positive integer.

18. The system of claim 6, wherein the second scanning pattern is $N^{th}$ from the first scanning pattern in an order of interleaving, wherein an area of the sub-aperture is equal to $(1-1/4N)\times(1-1/4N)$ of an area of the aperture.

19. A non-transitory computer-readable medium having instructions stored thereon, wherein the instructions, when executed by at least one processor, cause the at least one processor to perform a method for controlling an emission of laser beams using a plurality of scanning patterns by an optical sensing device, wherein the plurality of scanning patterns interleavingly cover a field of view of the optical sensing device, the method comprising:

detecting an object within a functional distance range from the optical sensing device based on a reflected first laser beam received by the optical sensing device, wherein the first laser beam is emitted towards a first scanning point in a first scanning pattern and the first scanning pattern includes a plurality of scanning points in addition to the first scanning point;

determining an aperture extending from the first scanning point in the first scanning pattern, wherein the aperture includes the plurality of scanning points of the first scanning pattern and a second scanning point in a second scanning pattern;

determining a sub-aperture within the aperture, wherein the sub-aperture includes the second scanning point and has a length that is smaller than a length of the aperture in a lateral scanning direction and a width that is smaller than a width of the aperture in the vertical scanning direction controlling the optical sensing device to emit a second laser beam towards the second scanning point in the second scanning pattern and skip the plurality of scanning points of the first scanning pattern between the first scanning point and the second scanning point in the aperture;

detecting whether the object is within the functional distance range from the optical sensing device based on a reflected second laser beam received by the optical sensing device; and controlling the optical sensing device to emit a third laser beam towards a third scanning point in the second scanning pattern in the sub-aperture when the controller detects that the object is not within the functional distance range from the optical sensing device based on the reflected second laser beam reflected by the optical sensing device.

* * * * *